US008643884B2

(12) United States Patent
Saeda

(10) Patent No.: US 8,643,884 B2
(45) Date of Patent: Feb. 4, 2014

(54) IMAGE FORMING SYSTEM, INFORMATION PROCESSING DEVICE, IMAGE FORMING DEVICE, DATA TRANSMISSION METHOD AND MEMORY PRODUCT

(75) Inventor: Masao Saeda, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 127 days.

(21) Appl. No.: 13/325,480

(22) Filed: Dec. 14, 2011

(65) Prior Publication Data

US 2012/0243038 A1  Sep. 27, 2012

(30) Foreign Application Priority Data

Mar. 25, 2011  (JP) .................................. 2011-68543

(51) Int. Cl.
*H04N 1/00* (2006.01)
*G06K 15/00* (2006.01)
*G06F 3/12* (2006.01)

(52) U.S. Cl.
USPC ......... 358/1.15; 358/403; 358/1.13; 358/1.16

(58) Field of Classification Search
None
See application file for complete search history.

(56) References Cited

U.S. PATENT DOCUMENTS

| 2006/0221359 | A1* | 10/2006 | Mokuya ......................... 358/1.1 |
| 2007/0229891 | A1* | 10/2007 | Yanagi et al. ................. 358/1.15 |
| 2008/0100863 | A1  | 5/2008  | Funahashi |
| 2009/0091783 | A1* | 4/2009  | Kazume et al. .............. 358/1.15 |
| 2010/0245885 | A1* | 9/2010  | Selvaraj ....................... 358/1.15 |

FOREIGN PATENT DOCUMENTS

| JP | 2003-237185 A | 8/2003 |
| JP | 2004-334670 A | 11/2004 |
| JP | 2005-190420 A | 7/2005 |
| JP | 2005-275724 A | 10/2005 |
| JP | 2008-112308 A | 5/2008 |
| JP | 2008-117349 A | 5/2008 |
| JP | 2008-172531 A | 7/2008 |
| JP | 2008-269298 A | 11/2008 |
| JP | 2009-223791 A | 10/2009 |
| JP | 2010-135993 A | 6/2010 |
| JP | 2012-118922 A | 6/2012 |

* cited by examiner

*Primary Examiner* — Benny Q Tieu
*Assistant Examiner* — Haris Sabah
(74) *Attorney, Agent, or Firm* — Birch, Stewart, Kolasch & Birch, LLP

(57) ABSTRACT

A region of a predetermined range including a location of the image forming device is determined based on location data representing a location of the image forming device stored in the print server. If the print server obtains positional data concerning the position of a mobile phone, the print server transmits data to the image forming device if, for example, the mobile phone is within the region, based on the positional data, the location data and the region, and the image forming device performs image forming based on the data.

11 Claims, 17 Drawing Sheets

F I G. 6
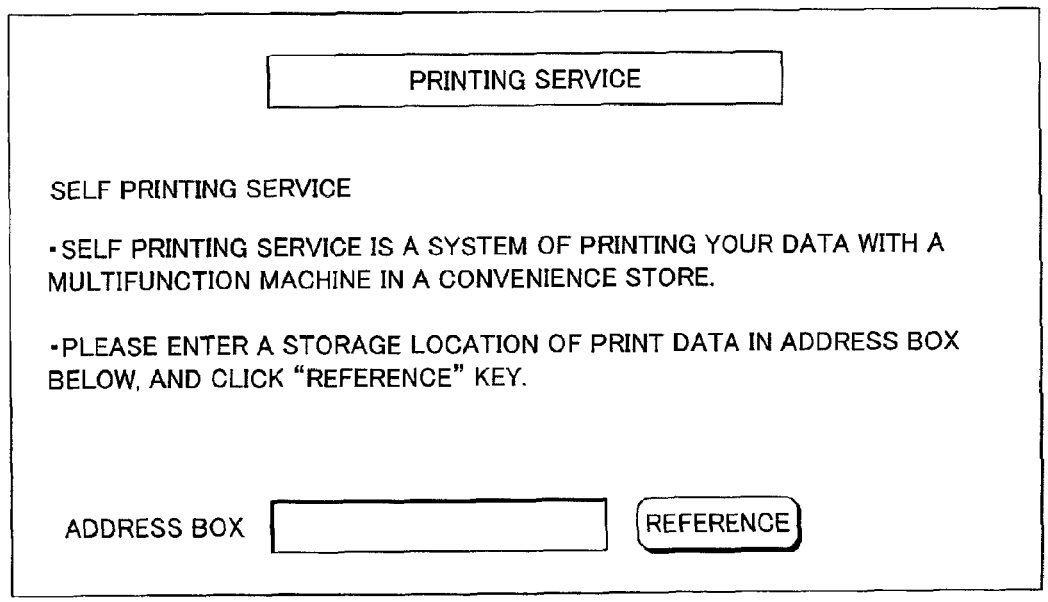

F I G. 8
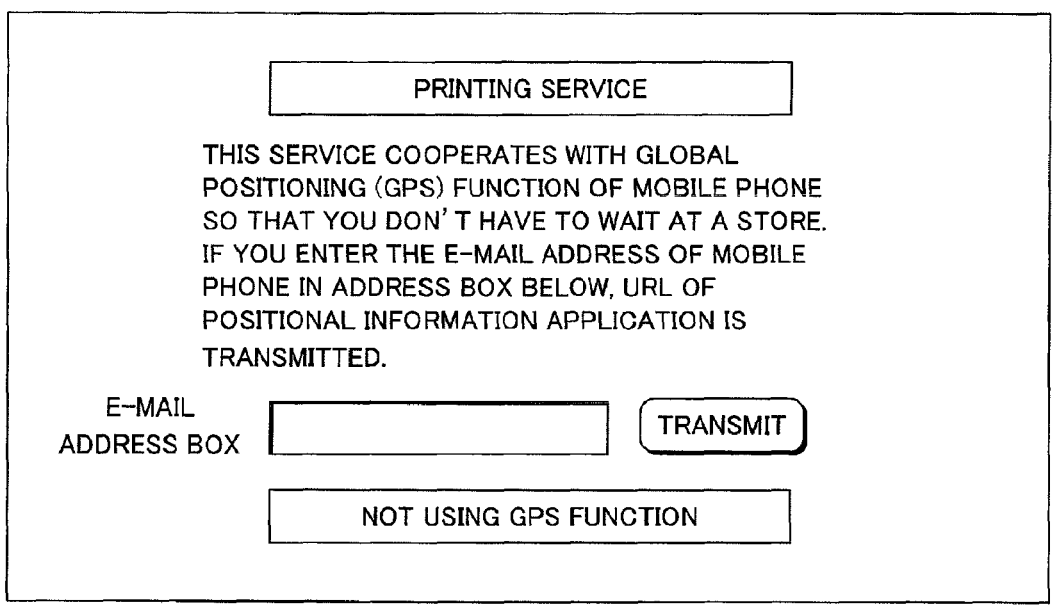

F I G. 9
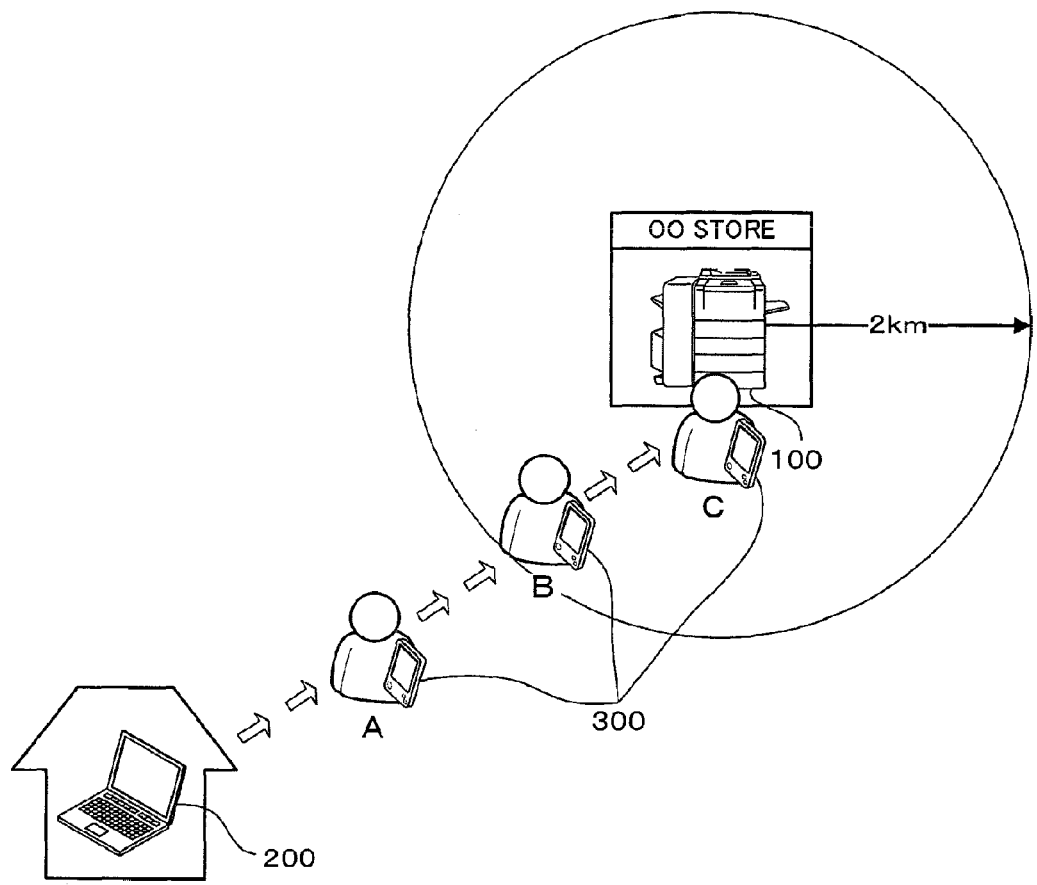

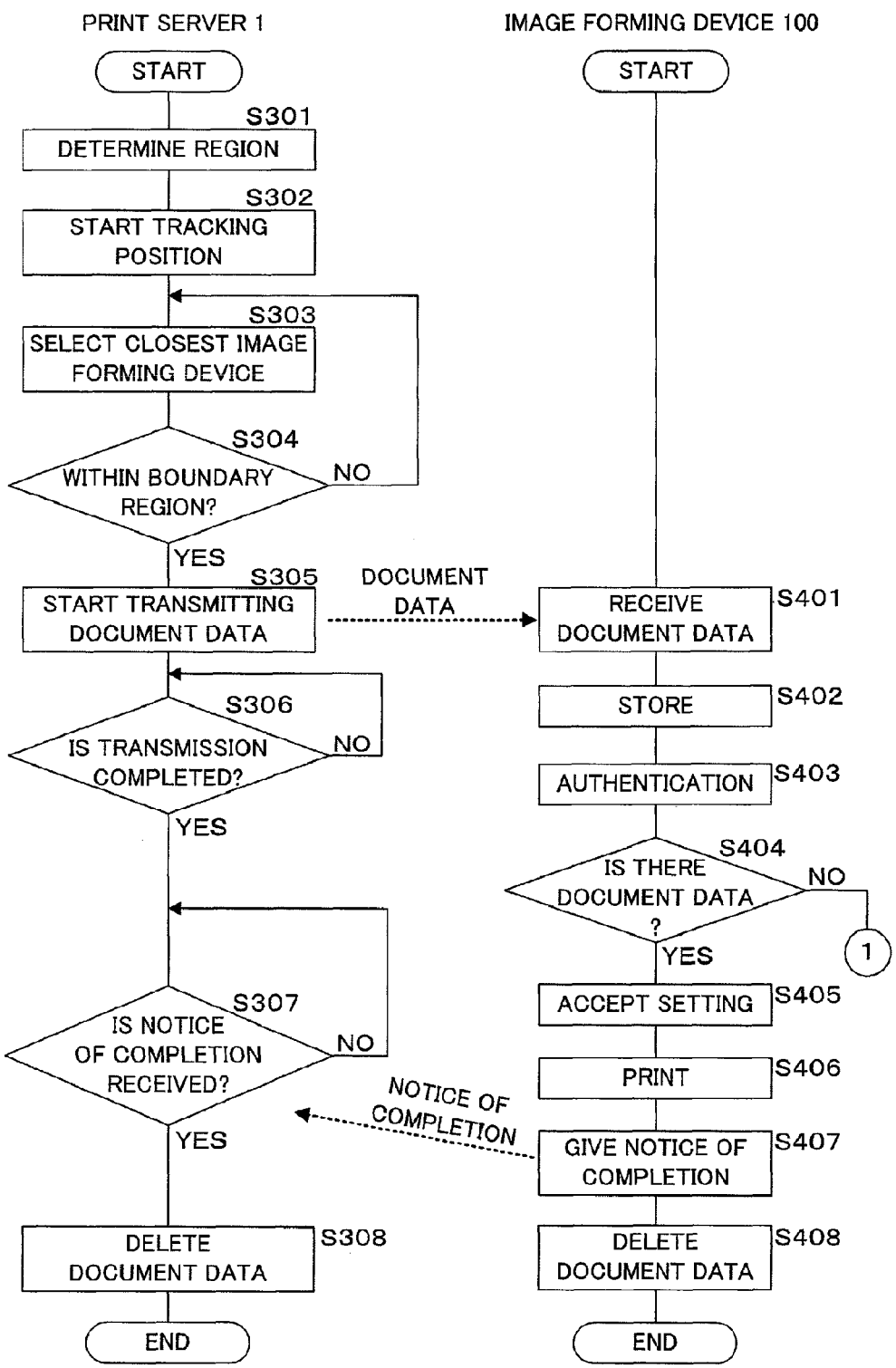

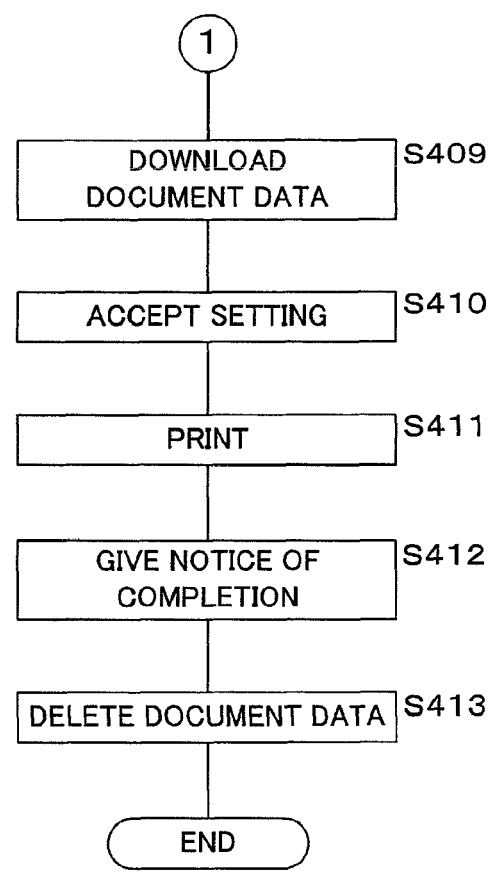
F I G. 10B

IMAGE FORMING SYSTEM, INFORMATION PROCESSING DEVICE, IMAGE FORMING DEVICE, DATA TRANSMISSION METHOD AND MEMORY PRODUCT

CROSS-REFERENCE TO RELATED APPLICATION

This Non-provisional application claims priority under 35 U.S.C. §119(a) on Patent Application No. 2011-068543 filed in Japan on Mar. 25, 2011, the entire contents of which are hereby incorporated by reference.

BACKGROUND

1. Technical Field

The present invention relates to an image forming system, an information processing device, an image forming device, a data transmission method and a memory product that can be employed to reduce waiting time in image formation by using an image forming device installed in a store or the like.

2. Description of Related Art

In recent years, such a printing service has been provided that a user registers data to be printed in a server of the printing service in advance and receives the data from the server using a printer at a location where the user is visiting, to obtain a printed matter based on the data.

For example, Japanese Patent Application Laid-Open No. 2003-237185 discloses an image forming device in that a user makes a phone call, when using a copying machine installed in a convenience store or the like, from his/her own mobile phone to an accounting management device of the copying machine and transmits by the accounting management device a startup signal to the copying machine, enabling the copying machine to be operable.

Moreover, Japanese Patent Application Laid-Open No. 2004-334670 discloses a document printing method in that a user makes a reservation for printing from a distant place to a store available for a printing service located near a place where the user is visiting and keeps document data to be printed in a server, to easily obtain a printed matter at the place where the user is visiting.

Furthermore, Japanese Patent Application Laid-Open No. 2008-117349 discloses an output device that obtains identification information of a wireless machine held by a user through communication with the wireless machine, obtains a document file corresponding to the obtained identification information from a server, and performs printing based on the document file when the user performs an operation to instruct for output.

SUMMARY

The image forming device described in Japanese Patent Application Laid-Open No. 2003-237185, however, does not disclose a server that stores data to be printed. The user has to take a trouble of storing the data in a storage medium or the like and bringing it to the store.

Moreover, with the document printing method disclosed in Japanese Patent Application Laid-Open No. 2004-334670, the document data to be printed which is kept in the server is downloaded by operation of the user only after the user arrives at the store to which the printing reservation is made, resulting that the user has to wait until the downloading is completed.

Furthermore, the output device disclosed in Japanese Patent Application Laid-Open No. 2008-117349 is configured to start downloading the document file from the server when a wireless communication device of the output device senses approaching of the user's wireless machine. Since the wireless communication device of the output device employs so-called Near Field Communication, the user still has to wait when there is a short time period from sensing of the user's wireless machine to arrival of the user at the store and when the document file to be downloaded has a large volume. There is also a problem of increased cost on the printing service side, since the output device disclosed in Japanese Patent Application Laid-Open No. 2008-117349 includes in each output device a wireless communication device that senses approaching of a user's wireless machine.

The present invention has been made with the aim of solving the above problems, and it is an object of the present invention to provide an image forming system, an information processing device, an image forming device, a data transmission method and a memory product in that the user is not required to carry a memory product or the like for data and does not have to wait for downloading of the data for which an image is to be formed, and that the cost can further be reduced.

An image forming system according to the present invention is an image forming system comprising: a mobile object; an information processing device that monitors traveling of the mobile object and stores reception data; and an image forming device that receives data from the information processing device to perform image forming, and is characterized in that the information processing device includes: a storage unit that stores a location data representing the location of the image forming device; a region determining means for determining a region of a predetermined range including the location of the image forming device; a position obtaining means for obtaining a positional data for a position of the mobile object; and a transmission means for transmitting data to the image forming device based on the positional data obtained by the position obtaining means, the location data and the region.

According to the present invention, the region determining means of the information processing device determines a region of a predetermined range including the location of the image forming device based on the location data stored in the storage unit of the information processing device. The position obtaining means of the information processing device obtains a positional data for the position of the mobile object. The transmission means of the information processing device transmits data to the image forming device, which performs image forming based on the obtained data.

The image forming system according to the present invention is characterized in that the information processing device includes a judgment means for judging whether or not the position of the mobile object is within the region based on the positional data obtained by the position obtaining means, and the transmission means starts, if the judgment means determines that the position of the mobile object is within the region, transmission of data to the image forming device.

According to the present invention, the judgment means of the information processing device judges whether or not the position of the mobile object is within the region based on the positional data obtained by the position obtaining means, and if it is determined that the position of the mobile object is within the region, the transmission means starts transmission of data to the image forming device.

The image forming system according to the present invention is characterized in that the region determining means of the information processing device determines the region based on a volume of data to be transmitted to the image forming device.

According to the present invention, the region determining means of the information processing device determines the region based on the volume of data to be transmitted to the image forming device. For example, as the volume of data to be transmitted is larger, the range determined as the region becomes wider.

The image forming system according to the present invention is characterized in that the information processing device includes an instruction transmitting unit that transmits a deleting instruction for deleting reception-completed data to the image forming device if the judgment means determines that the position of the mobile object is outside the region after the transmission means started transmission of data to the image forming device, and the image forming device includes a means for deleting, if the deleting instruction is received, the reception-completed data up to a time point when the deleting instruction is received.

According to the present invention, after the transmission means of the information processing device started transmission of data to the image forming device, if the judgment means of the information processing device determines that the position of the mobile object is outside the region, the instruction transmitting means of the information processing device transmits the deleting instruction to the image forming device. When the deleting instruction is received, the image forming device deletes reception-completed data up to that point.

The image forming system according to the present invention is characterized in that the image forming device includes an end notification means for giving, when image forming based on the data received from the information processing device is completed, a notice of completion to the information processing device, and the information processing device includes a means for deleting data for the image forming when the notice is received.

According to the present invention, when image forming based on the data received from the information processing device is completed, the end notification means of the image forming device gives a notice indicating that the image forming is completed to the information processing device. The information processing device deletes data for the image forming when such a notice is received.

The image forming system according to the present invention is characterized in that a plurality of the image forming devices are provided, and that the information processing device includes a selection means for selecting any one of the image forming devices based on the positional data obtained by the position obtaining unit and the location data stored in the storage unit.

According to the present invention, when there are more than one image forming devices, the selection means of the information processing device selects any one of the plural image forming devices based on the positional data obtained by the position obtaining means of the information processing device and the location data stored in the storage unit of the information processing device.

An information processing device according to the present invention is an information processing device that monitors traveling of a first external device, stores received data and transmits stored data to a second external device, and is characterized by comprising: a storage unit that stores location data representing a location of the second external device; a region determining means for determining a region of a predetermined range including a location of the second external device; a position obtaining means for obtaining positional data for a position of the first external device; and a transmission means for transmitting data to the second external device based on the positional data obtained by the position obtaining means, the location data and the region.

According to the present invention, the region determining means determines a region of a predetermined range including the location of the second external device based on the location data stored in the storage unit. The position obtaining means obtains positional data concerning the position of the first external device. The transmission means transmits data to the second external device based on the positional data, the location data and the region.

The information processing device according to the present invention is characterized in that a judgment means is provided for judging whether or not the position of the first external device is within the region based on the positional data obtained by the position obtaining means, and the transmission means is configured to start transmission of data to the second external device if the judgment means determines that the position of the first external device is within the region.

According to the present invention, the judgment means determines whether or not the position of the first external device is within the region based on the positional data obtained by the position obtaining means, and if it is determined that the position of the first external device is within the region, the transmission means starts transmission of data to the second external device.

The information processing device according to the present invention is characterized in that the region determining means determines the region based on a volume of data to be transmitted to the second external device.

According to the present invention, the region determining means determines the region based on the volume of data to be transmitted to the second external device. For example, as the volume of data to be transmitted is larger, a wider range is determined as the region.

The information processing device according to the present invention is characterized by comprising an instruction transmitting means that transmits a deleting instruction, when the judgment means determines that the position of the first external device is outside the region after the transmission means started transmission of data to the second external device, for deleting reception-completed data to the second external device.

According to the present invention, after the transmission means started transmission of data to the second external device, if the judgment means determines that the position of the first external device is outside the region, the instruction transmitting means transmits the deleting instruction to the second external device.

The information processing device according to the present invention is characterized by comprising a means for deleting data transmitted to the second external device when a predetermined notice is received from the second external device.

According to the present invention, if, for example, a predetermined notice is received from the second external device, the data transmitted to the second external device by the transmission means is deleted.

An image forming device according to the present invention is an image forming device that receives data from the information processing device according to any one of the aspects described above, and is characterized by comprising: a reception unit that receives, when data is received from the information processing device, a deleting instruction for deleting reception-completed data from the information processing device; and a means for deleting, when the deleting instruction is received, the reception-completed data up to a time point when the deleting instruction is received.

According to the present invention, when the deleting instruction is received from the information processing device at the time of receiving data from the information processing device, the reception-completed data up to that point is deleted.

The image forming device according to the present invention is characterized by comprising a deleting means for deleting data for image forming when the image forming based on the data received from the information processing device is completed.

According to the present invention, when image forming based on the data received form the information processing device is completed, the deleting means deletes the data concerning image forming that has been finished.

A data transmission method according to the present invention is a data transmission method of transmitting data in an information processing device, which includes a storage unit in which a location data representing a location of a second external device is stored, and that performs monitoring of traveling of a first external device, storage of received data and transmission of the stored data to the second external device, and is characterized by comprising: a region determining step of determining a region of a predetermined range including the location of the second external device; a position obtaining step of obtaining positional data for a position of the first external device; a judging step of judging whether or not the position of the first external device is within the region based on the positional data obtained at the position obtaining step; and a transmitting step of starting transmission of data to the second external device if the position of the first external device is determined to be within the region at the judging step.

A memory product according to the present invention is a memory product in which a computer program is recorded for causing a computer to transmit data, the computer constituting an information processing device including a storage unit and performing monitoring of traveling of a first external device, storage of received data and transmission of the stored data to a second external device, wherein a location data representing a location of the second external device is stored in the storage unit, the computer program comprises: a region determining step of causing the computer to determine a region of a predetermined range including the location of the second external device; a position obtaining step of causing the computer to obtain positional data concerning the position of the first external device; a judging step of causing the computer to judge whether or not the position of the first external device is within the region based on the positional data obtained at the position obtaining step; and a transmitting step of causing the computer to start transmission of data to the second external device if the position of the first external device is determined to be within the region at the judging step.

According to the present invention, the region of a predetermined range including the location of the second external device is determined based on the location data stored in the storage unit. The positional data for the position of the first external device is obtained, and the position of the first external device is determined whether or not it is within the region based on the obtained positional data. If it is determined that the position of the first external device is within the region, transmission of data to the second external device is started. Moreover, a computer reads out a computer program from the memory product to realize the image forming system, information processing device, image forming device and data transmission method described above.

According to the present invention, data concerning image forming is transmitted from the information processing device to the image forming device (second external device). Thus, a user does not have to carry a storage medium and the like. In addition, since the data for image forming is received by the image forming device (second external device) before the user arrives thereat, the user does not have to wait for the data concerning image forming to be downloaded. Moreover, the position of a mobile object (mobile phone) is detected by the information processing device, eliminating the need for another device for detecting the position in each image forming device (second external device) and thus enabling reduction in cost.

The above and further objects and features of the invention will more fully be apparent from the following detailed description with accompanying drawings.

BRIEF DESCRIPTION OF THE SEVERAL VIEWS OF THE DRAWINGS

FIG. 6 is an illustrative view showing an example of a registration screen for printing service;

FIG. 8 is an explanatory view showing a registration screen for requesting input of an electronic mail address for a mobile phone of a user;

FIG. 9 is an explanatory view illustrating the relationship between traveling of a user and a boundary region in the image forming system according to Embodiment 1;

FIGS. 10A and 10B illustrate flowcharts showing examples of processing performed between the print server and image forming device in the image forming system of Embodiment 1;

DETAILED DESCRIPTION

The following will describe in detail an image forming system, a data transmission method and a computer program according to the present invention with reference to the drawings, in which a print server, a multifunction machine and a mobile phone are employed as examples for an information processing device, an image forming device and a mobile object, respectively, according to the present invention.
(Embodiment 1 )

Figure 1:
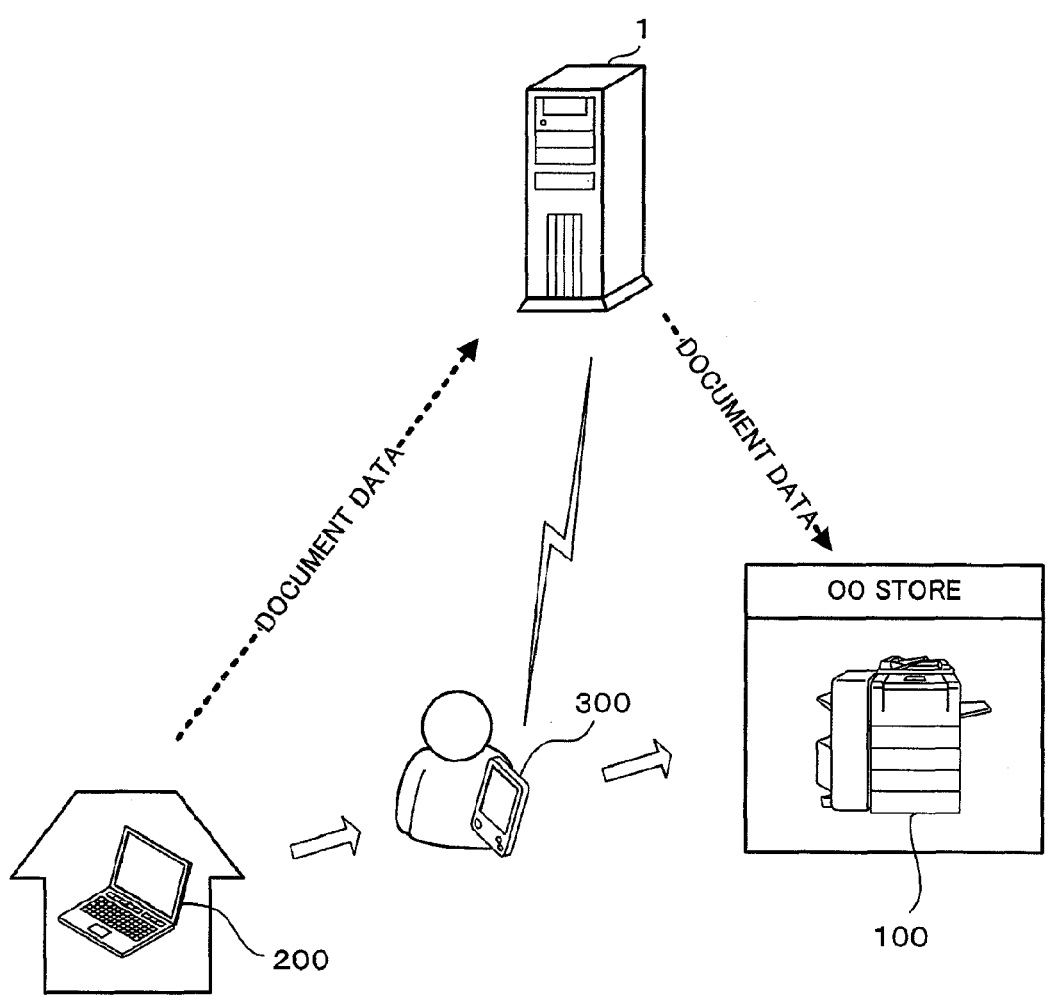
FIG. 1 is a conceptual view schematically illustrating an image forming system according to Embodiment 1.

FIG. 1 is a conceptual view schematically illustrating an image forming system according to Embodiment 1.

In the image forming system according to the present invention, a user creates a document using a personal computer 200 at home. When printing the document, the user transmits data for the document (hereinafter referred to as "document data") to a print server 1, which stores the received document data. Thereafter, the user carries, for example, a mobile phone 300 and goes to a convenience store (hereinafter referred to as "store") nearby.

The print server 1 transmits the document data to an image forming device 100 in the store at an appropriate time point. The user who arrived at the store performs printing (image-forming) using the document data received by the image forming device 100.

Meanwhile, the mobile phone 300 having a GPS (Global Positioning System) function transmits positional data indicating the position of the user (mobile phone 300) to the print server 1 at predetermined time intervals. Thus, the print server 1 can obtain the positional data of the user so as to track the position of the user.

Figure 2:
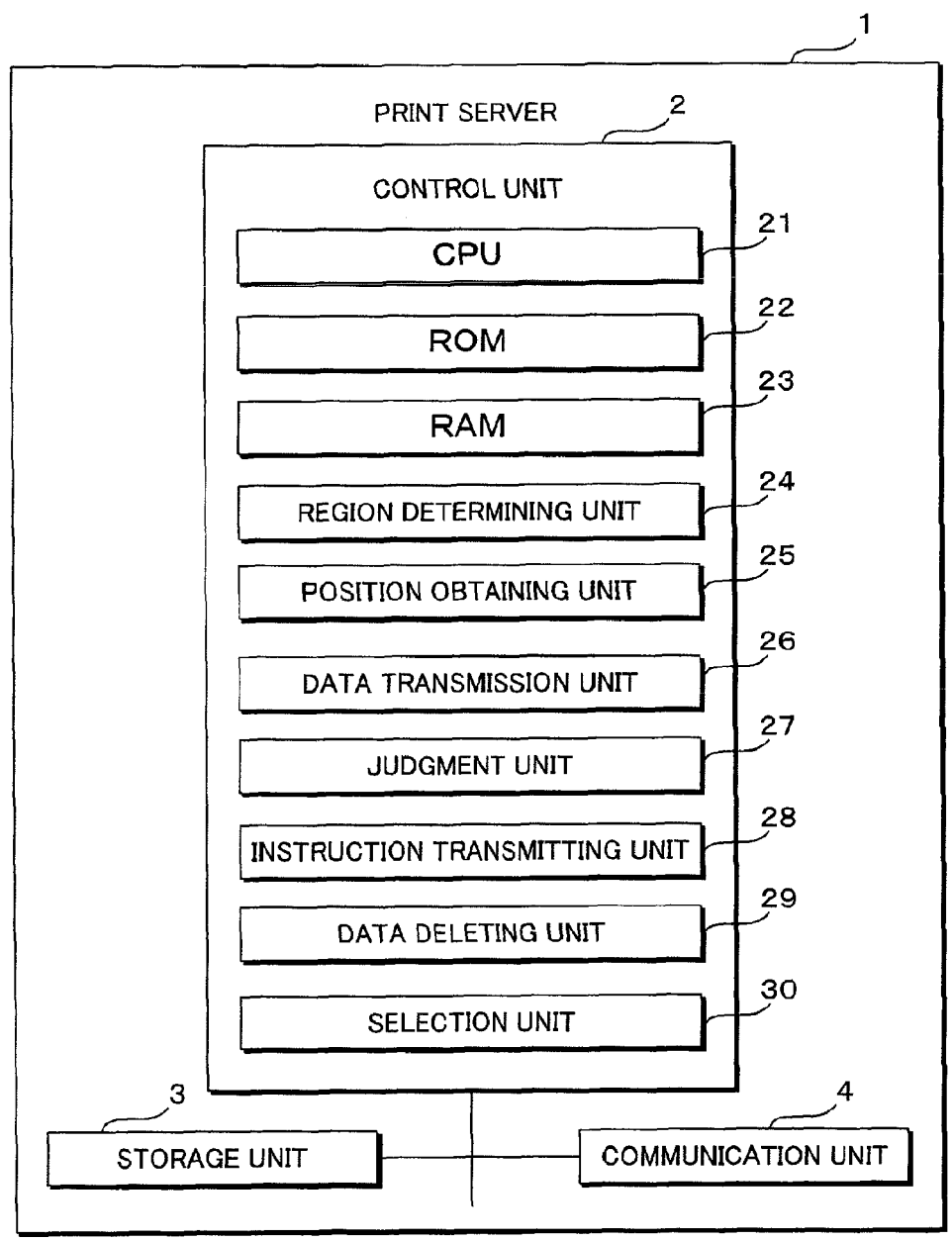
FIG. 2 is a functional block diagram illustrating a configuration of a main part of a print server included in the image forming system according to Embodiment 1.

FIG. 2 is a functional block diagram illustrating a configuration of a main part of the print server 1 according to Embodiment 1. The print server 1 is provided with a control unit 2, a storage unit 3 and a communication unit 4.

The storage unit 3 corresponds to a non-volatile storage medium such as a flash memory, EEPROM, HDD, MRAM (Magneto-resistive Random Access Memory), FeRAM (Ferroelectric Random Access Memory), OUM or the like. Moreover, the storage unit 3 stores therein document data received from an external device (e.g. personal computer 200) through the communication unit 4. The document data is stored in association with identification data of a sender indicating the personal computer 200 which transmitted the document data received through the communication unit 4, and with the e-mail address of the mobile phone 300. The document data is transmitted to the image forming device 100 in the store through the communication unit 4.

Also stored in the storage unit 3 is location data indicating a location of the image forming device 100. That is, the data indicating a location of each store in which the image forming device 100 is installed is stored.

The communication unit 4 corresponds to a network card, a modem or the like, and can be connected to a communication network such as a public line network, LAN (Local Area Network), the Internet or the like (not illustrated). Moreover, the communication unit 4 receives the document data, identification data of the sender, e-mail address data of mobile phone 300 from the personal computer 200. The print server 1 performs transmission with the personal computer 200 and the image forming device 100 through the communication unit 4.

Furthermore, the communication unit 4 is configured to be able to perform wireless communication with the mobile phone 300. Hence, when the user travels with the mobile phone 300, the position of the user can be tracked by wireless communication with the mobile phone 300.

The control unit 2 is provided with a CPU 21, a ROM 22, a RAM 23, a region determining unit 24, a position obtaining unit 25, a data transmission unit 26, a judgment unit 27, an instruction transmitting unit 28, a data deleting unit 29 and a selection unit 30.

Various control programs, basically-fixed data among parameters for operation and the like are stored in the ROM 22 in advance. The RAM 23 can temporarily store data, which can be read out regardless of its storing order, stored position or the like. Moreover, the RAM 23 stores, for example, a program read out from ROM 22, various data generated by executing the program, a parameter varied as appropriate in executing the program and the like.

The CPU 21 loads a control program pre-stored in the ROM 22 on the RAM 23 and executes the control program, to control various types of hardware units described above and to make the entire device operate as the print server 1 of the present invention. The region determining unit 24 determines a region of a predetermined range including a location of a predetermined store in which image forming device 100 is installed based on the location data stored in the storage unit 3. As a default, a region within a radius of 2 km from the location of the predetermined store is determined as the region of a predetermined range described above. The data transmission unit 26 transmits document data to the image forming device 100 corresponding to that region based on whether or not the user (mobile phone 300) is within the range. This region will hereinafter be referred to as a boundary region.

In addition, the region determining unit 24 determines the boundary region based on the volume of the document data to be transmitted by the data transmission unit 26. Thus, the transfer speed decreases as the volume of data to be transmitted becomes larger. To address this, the region determining unit 24 determines the boundary region in accordance with the volume of document data to be transmitted. For example, if the volume of document data to be transmitted is equal to or less than 4 Mb, the region determining unit 24 determines a range within a radius of 2 km as the boundary region. If the volume of document data is more than 4 Mb, the range within a radius of 4 km is determined as the boundary region. Note that the range determined as the boundary region is not limited to 2 km or 4 km. The time required for downloading the document data is compared with the time required for the user to arrive at the store (image forming device 100). A distance corresponding to the time required to complete downloading before the user arrives at the store (image forming device 100) may be set as a range determined as the boundary region.

The position obtaining unit 25 obtains the positional data transmitted from the mobile phone 300 through the communication unit 4. For example, the mobile phone 300 receives electric wave from an artificial satellite to measure its own position, and transmits the measured result to the position obtaining unit 25.

The method of obtaining the positional data of mobile phone 300 by the position obtaining unit 25 is not limited to the one described above. It is also possible for the mobile phone 300 to transmit electric wave received from an artificial satellite (time signal data, all satellite orbit data and satellite orbit data) to the print server 1 and measure the position of mobile phone 300 by the position obtaining unit 25.

Moreover, a so-called A-GPS (Assisted-Global Positioning System) can also be employed instead of GPS.

Furthermore, since the mobile phone 300 consistently communicates with a nearby base station, the position obtaining unit 25 can also obtain positional data of mobile phone 300 based on the position of the base station that made communication with mobile phone 300.

The selection unit 30 selects a predetermined store based on the positional data of mobile phone 300 obtained by the position obtaining unit 25. More specifically, the selection unit 30 selects any one of the image forming devices 100 (stores) based on the position specified on the basis of the positional data of mobile phone 300 that is obtained by the position obtaining unit 25 and the location data stored in storage unit 3. The selection unit 30 selects, for example, an image forming device 100 (store) which is the closest to the position of the user (mobile phone 300).

The judgment unit 27 judges whether or not the user is present within the boundary region determined by the region determining unit 24. More specifically, it judges if the position specified based on the positional data of mobile phone 300 that is obtained by the position obtaining unit 25 is within the boundary region determined by the region determining unit 24. The judging process performed by the judgment unit 27 is repeated at predetermined time intervals.

If the judgment unit 27 judges that the user is within the boundary region determined by the region determining unit 24, the data transmission unit 26 reads out document data corresponding to the e-mail address of mobile phone 300 carried by the user from the storage unit 3, and starts transmitting the data to the image forming device 100 in the store selected by the selection unit 30.

The instruction transmitting unit 28 transmits through the communication unit 4 an instruction for deleting data which has been started its transmission and has already been completed its reception by that time (reception-completed data) to the device which received the document data. Such an instruction will hereinafter be referred to as "aborting instruction." More specifically, if the judgment unit 27 judges that there is no user within the boundary region, i.e. within the boundary region for the image forming device 100 after the data transmission unit 26 started transmission of the document data to the image forming device 100, the instruction transmitting unit 28 transmits the aborting instruction as described above to the image forming device 100 which is to receive the document data. The image forming device 100 that received the aborting instruction deletes the data that has been received by that time.

The data deleting unit 29 deletes from the storage unit 3 the document data transmitted to the image forming device 100 when a notice of completion described later is received from the image forming device 100.

Figure 3:
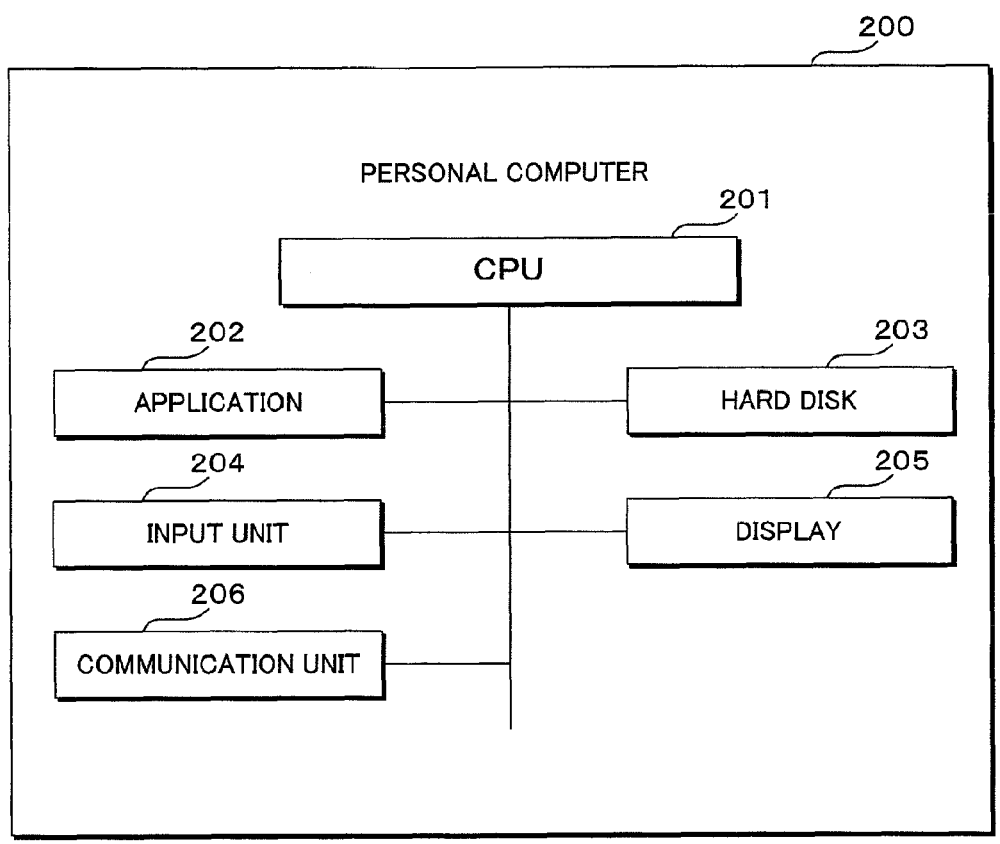
FIG. 3 is a functional block diagram illustrating a configuration of a main part of a personal computer included in the image forming system according to Embodiment 1.

FIG. 3 is a functional block diagram illustrating a configuration of a main part of the personal computer 200 included in the image forming system according to Embodiment 1. For example, the personal computer 200 is connected to the print server 1 through the Internet and creates a document (document data), which is transmitted to and stored in the print server 1. The print server 1 transmits the document data to the image forming device 100 as described above, and the image forming device 100 performs image forming based on the document data.

The personal computer 200 uses Windows of Microsoft Co., for example, as an operating system (OS). Moreover, the personal computer 200 is provided with a CPU 201, an application 202, a hard disk 203, an input unit 204, a display 205 and a communication unit 206.

The application 202 corresponds to an application program which provides functions of, for example, text editing such as word processing, painting and presentation. The document data created by the application 202 is stored in the hard disk 203.

The input unit 204 corresponds to, for example, a keyboard and a mouse. The application 202 creates document data by accepting data input through the input unit 204.

The display 205 corresponds to, for example, a Liquid Crystal Display (LCD) or an ElectroLuminescence (EL) panel, and displays a registration screen or the like when the created document data is transmitted to and registered in the print server 1.

The communication unit 206 includes a network card, a modem and the like for transmitting, for example, the document data and an e-mail address of a user's mobile phone which will be described later to the print server 1.

In addition, the CPU 201 loads a control program prestored in the ROM (not illustrated) on the RAM (not illustrated) and executes the control program, to control the main part described above and to make the entire device operate as the personal computer 200 of the present invention.

Figure 4:
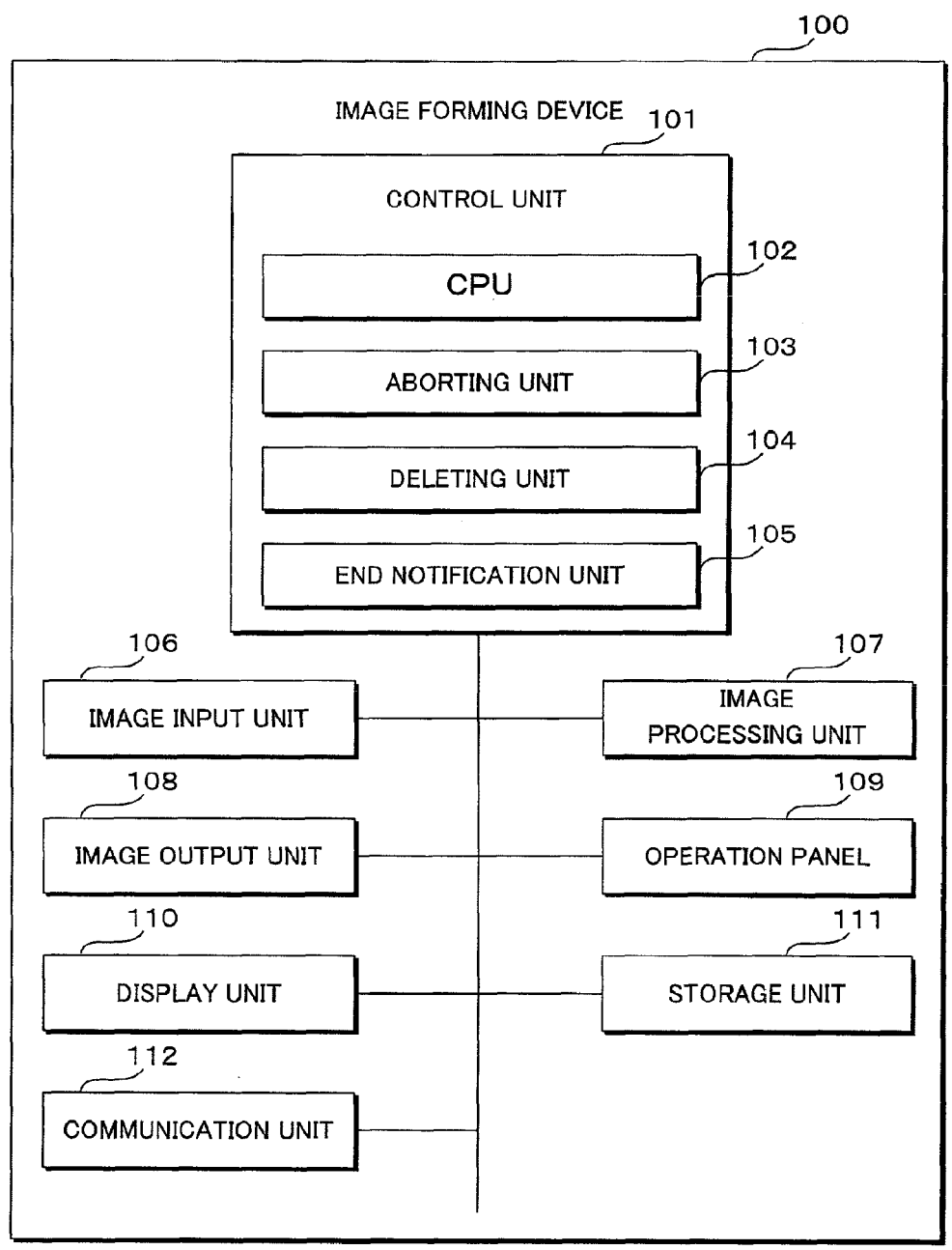
FIG. 4 is a functional block diagram illustrating a configuration of a main part of an image forming device included in the image forming system according to Embodiment 1.

FIG. 4 is a functional block diagram illustrating a configuration of a main part of the image forming device 100 according to Embodiment 1. The image forming device 100 corresponds to a digital multifunction machine having functions of color copying, color scanning and the like. The image forming device 100 is provided with an image input unit 106 that optically reads an image from an original manuscript. The image input unit 106 is connected to an image processing unit 107 generating image data in accordance with the read image. The image processing unit 107 is connected to an image output unit 108 that outputs an image based on the image data generated by the image processing unit 107 and to a communication unit 112 that transmits the image data generated by the image processing unit 107 to the outside and receives image data from the outside. An image based on the image data is displayed on a display unit 110.

The image input unit 106, image processing unit 107, image output unit 108, display unit 110 and communication unit 112 are further connected to an operation panel 109 that accepts operation from the user.

Next, the configuration of each part of the image forming device 100 will be described.

The operation panel 109 includes an operation unit, such as a touch panel or a numeric keypad, which accepts an instruction for controlling the operation of the image forming device 100, e.g. a setting instruction for setting the operation mode of the image forming device 100, in response to the user handling the unit, and includes the display unit 110 that displays information necessary for operation. The display unit 110 corresponds to, for example, an LCD or EL panel.

The image input unit 106 corresponds to, for example, a color scanner provided with an optical sensor such as CCD (Charge Coupled Device). The image input unit 106 separates a reflection image from the original manuscript, i.e. a recording sheet such as a paper with a recorded image, into different colors of RGB (R: red, G: green, B: blue) and reads them by an optical sensor. The image input unit 106 further converts the read color images into analog signals of RGB and outputs the signals to the image processing unit 107.

The image processing unit 107 performs image processing on the analog signals of RGB input from the image input unit 106 to generate image data including digital signals of RGB (hereinafter referred to as RGB signals). The image processing unit 107 further executes image processing on the RGB signals to generate image data including digital signals of CMYK (C: cyan, M: magenta, Y: yellow, K: black) and outputs the image data as a stream to the image output unit 108. The image processing unit 107 may have a configuration in that the image data is once stored in a storage unit 111 before it is output to the image output unit 108.

The storage unit 111 corresponds to a non-volatile storage device such as a hard disk, which stores document data received from the print server 1.

The image output unit 108 forms an image on a recording sheet such as a paper in a manner of thermal transfer, electrophotography, ink-jet printing and the like based on the image data input from the image processing unit 107, and outputs the formed image.

The communication unit 112 corresponds to a network card, modem or the like, which can be connected to a communication network (not illustrated) such as a public line network, LAN (Local Area Network), the Internet or the like. The communication unit 112 transmits/receives data to/from the outside through the communication network by a communication method such as a facsimile, an electronic mail or the like. For example, the image forming device 100 is connected to the print server 1 through the communication unit 112, and receives document data and aborting instruction from the print server 1 through the communication unit 112.

The image forming device 100 is further provided with a control unit 101. The control unit 101 controls each of the hardware units described above included in the image forming device 100. The control unit 101 includes a CPU 102, an aborting unit 103, a deleting unit 104 and an end notification unit 105.

When the aborting instruction described earlier is received from the print server 1, the aborting unit 103 deletes the data which has been received by that time (reception-completed data) from the storage unit 111.

When the image forming based on the document data received from the print server 1 is terminated, the deleting unit 104 deletes the document data from the storage unit 111.

When the image forming based on the document data received from the print server 1 has ended, the end notification unit 105 transmits a notice indicating that the image forming has ended (notice of completion) to the print server 1 through the communication unit 112.

The CPU 102 loads the control program pre-stored in the ROM (not illustrated) on the RAM (not illustrated) and executes the program to make the entire device operate as the image forming device 100 of the present invention.

An example of the processing performed by the image forming system according to Embodiment 1 will be described below. As a matter of convenience for explanation, an example will be described where the user transmits document data created using the personal computer 200 at home to the print server 1 and image forming is performed at the image forming device 100 installed in a store closest to the user's home based on the document data.

First, the processing is described in that the user creates a document with the personal computer 200 and transmits document data concerning the created document to the print server 1 for registration and storage.

Figure 5:
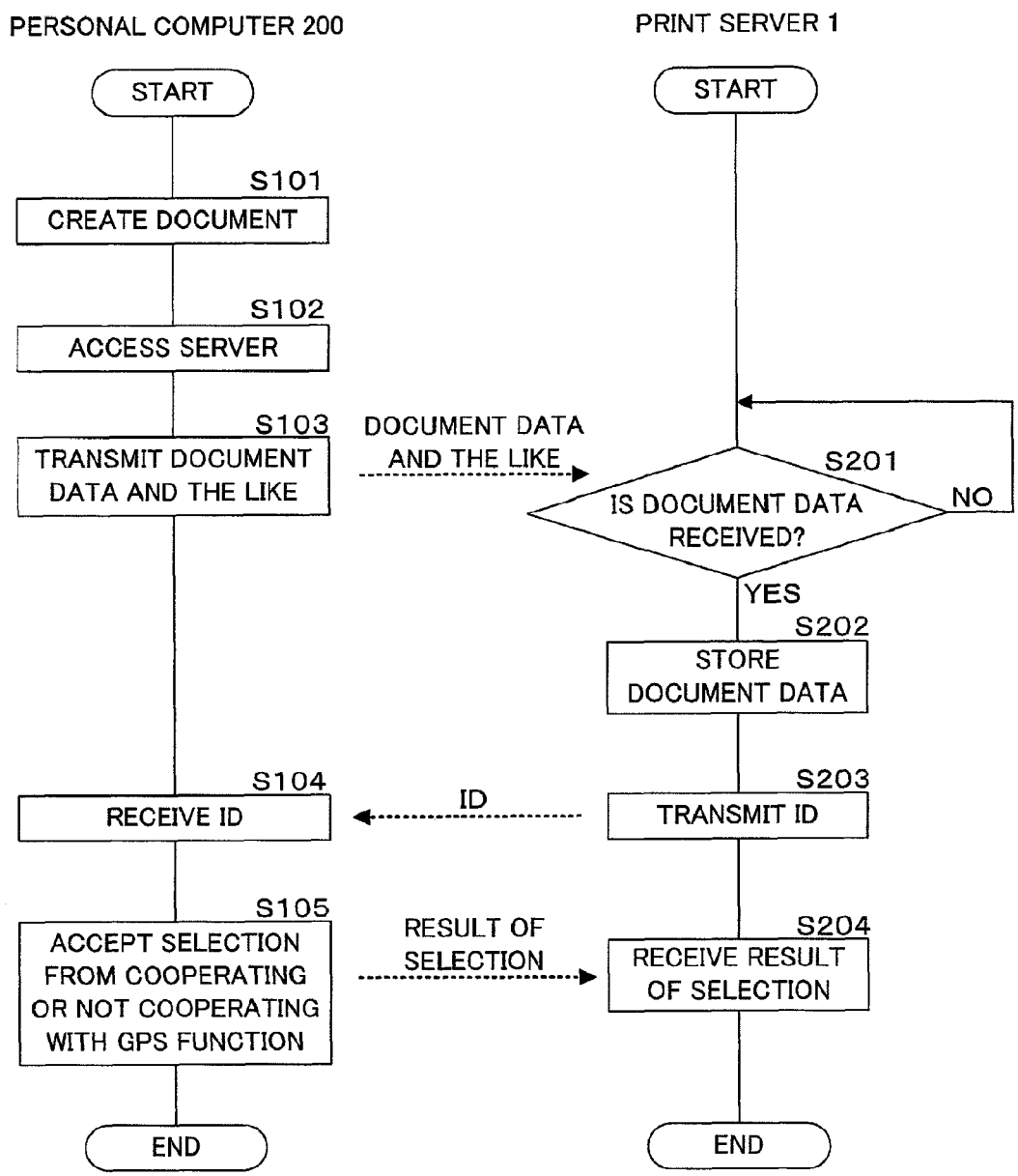
FIG. 5 is a flowchart illustrating an example of processing performed between the personal computer and print server in the image forming system according to Embodiment 1.

FIG. 5 is a flowchart illustrating an example of processing performed between the personal computer 200 and the print server 1 in the image forming system according to Embodiment 1.

First, the user creates a document using the personal computer 200 at home. That is, the user inputs data through a keyboard of the input unit 204. The document (document data) is created on the application 202 based on the data accepted from the user through the input unit 204 (step S101).

After creation of the document is completed, the user accesses the print server 1 with the personal computer 200 (step S102). After accessing the print server 1, the user appropriately operates the input unit 204 to input a login name and a password for login.

Then, the user selects an application for using a printing service for printing (image-forming) the created document at the image forming device 100 in a store. When the application is selected, a registration screen for registering the document data to be printed using the printing service is shown on the display 205 of the personal computer 200.

FIG. 6 is an illustrative view showing an example of a registration screen for printing service. On the registration screen in FIG. 6, a brief explanation for the printing service and an input box (address box) for entering the location of the document data to be printed with the printing service are displayed.

Figure 7:
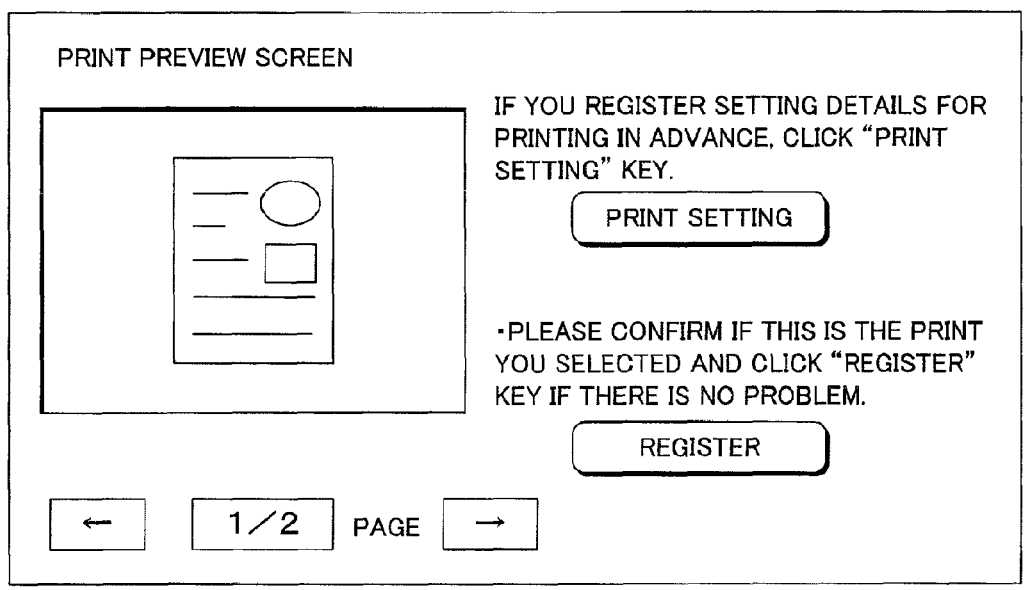
FIG. 7 is an explanatory view showing a registration screen for accepting setting for printing.

If the user enters URL (identification data of a sender) of the personal computer 200 in the input box and operates the soft key indicating "reference," the next registration screen for accepting setting for printing of the document data to be printed is shown on the display 205. FIG. 7 is an explanatory view showing the registration screen for accepting setting for printing.

On the registration screen in FIG. 7, a preview image based on the document data to be printed is displayed for the user to confirm the setting based on the preview image. The user operates the soft key indicating "print setting" on the registration screen shown in FIG. 7 to determine the setting for printing of the document data (hereinafter referred to as "print setting"). When the print setting is completed, the user operates the soft key indicating "register" on the registration screen shown in FIG. 7, and then the CPU 201 accepts an instruction for transmitting the document data. Here, the CPU 201 transmits the print setting and URL accepted through the registration screen as well as the document data created on the personal computer 200 to the print server 1 through the communication unit 206 (step S103).

Meanwhile, the print server 1 determines whether or not the CPU 21 received from the personal computer 200 the document data as well as the URL and print setting for the personal computer 200 (step S201).

If it is determined that the CPU 21 has not received the document data and the like (step S201: NO), the print server 1 waits until the CPU 21 receives the document data and the like from the personal computer 200. If, on the other hand, it is determined that the CPU 21 has received the document data and the like from the personal computer 200 (step S201: YES), the received document data is stored in the storage unit 3 by associating it with the URL of personal computer 200 and the print setting (step S202).

Thereafter, the CPU 21 issues an ID (PIN number, for example), and transmits the issued ID to the personal computer 200 through the communication unit 4 together with an application for cooperating with the GPS function of the mobile phone 300 (step S203). The ID is stored in the storage unit 3 in association with the received document data.

The CPU 201 of the personal computer 200 receives the ID and application through the communication unit 206 (step S104). The CPU 201 loads the received application on the RAM (not illustrated) and executes the application, and displays the received ID for the user to see it on the display 205.

Subsequently, the CPU 201 uses, for example, the received application to display another registration screen for requesting an input of the e-mail address for the user's mobile phone 300 on the display 205. FIG. 8 is an explanatory view showing a registration screen for requesting the input of the e-mail address for the user's mobile phone 300.

On the registration screen shown in FIG. 8, a notion indicating that the e-mail address of the mobile phone 300 is required in order to cooperate with the GPS function of the user's mobile phone 300 and an input box (e-mail address box) for entering an e-mail address are shown. Moreover, for the user who prefers not to use the GPS function of the mobile phone 300, a soft key indicating "not using GPS function" is also provided.

Thus, the user either enters the e-mail address of the mobile phone 300 in the input box or operates the soft key indicating "not using GPS function," to select whether or not the print server 1 cooperates with the GPS function of the mobile phone 300. Depending on such selection made by the user, the CPU 201 accepts, through the registration screen, the selection of whether or not the print server 1 should cooperate with the GPS function (step S105).

The CPU 201 transmits the accepted result of selection for cooperating or not cooperating with the GPS function to the print server 1. The CPU 21 of the print server 1 receives the result of selection through the communication unit 4 (step S204).

More specifically, if the user enters the e-mail address in the input box for e-mail address and operates the soft key indicating "transmit," i.e., if the CPU 201 accepts the input of e-mail address and operation of the soft key indicating "transmit" through the registration screen, the CPU 201 transmits the accepted e-mail address of the mobile phone 300 to the print server 1 through the communication unit 206, which completes the registration of document data.

In such a case, the CPU 21 of the print server 1 receives the e-mail address of the mobile phone 300 from the personal computer 200, and stores the received e-mail address in the storage unit 3 by associating it with the document data received at step S201. In addition, the CPU 21 can receive positional data indicating the position of the mobile phone 300 from the user's mobile phone 300.

After registering the e-mail address of the mobile phone 300, the print server 1 may provide, to the registered e-mail address, a position obtaining application program for obtaining a positional data, or a method for downloading the position obtaining application program through the Internet. In this case, even if the mobile phone 300 does not have the position obtaining application program in advance, the print server 1 can receive positional data of the mobile phone 300 by installing the application program to the mobile phone 300 by a user.

If, on the other hand, the user operates the soft key of "not using GPS function," the result of selection indicating no cooperation with GPS function is transmitted to the print server 1, which completes the registration of the document data.

Subsequently, an example will be described in which the user who completed registration of the document data to the print server 1 goes to a store closest to his/her home and performs image forming based on the registered document data using the image forming device 100 installed in the store.

FIG. 9 is an explanatory view illustrating the relationship between traveling of the user and a boundary region in the image forming system according to Embodiment 1. The user transmits document data to be printed to the print server 1 and registers the data, and then goes to a closest store while carrying the mobile phone 300. Here, the volume of the document data is assumed to be 4 Mb or smaller.

FIGS. 10A and 10B illustrate flowcharts showing examples of the processing performed between the print server 1 and image forming device 100 in the image forming system of Embodiment 1.

At step S204 in FIG. 5, if the result of selection indicating cooperation with the GPS function is received by the print server 1, i.e., if the print server 1 receives the e-mail address of the mobile phone 300, the region determining unit 24 determines a boundary region by the method described above (step S301). The phone number and e-mail address of the mobile phone 300 are stored in the print server 1 in association with each other, so that the user can be identified upon reception of the e-mail address.

Since the document data received by the print server 1 from the personal computer 200, i.e. the volume of the document data to be transmitted to the image forming device 100 in a store is not more than 4 Mb, the region determining unit 24 sets the range within a radius of 2 km from the location of the closest store as a boundary region.

Subsequently, the CPU 21 starts tracking the position of the user (step S302). In other words, the CPU 21 instructs the position obtaining unit 25 for tracking the position, and the position obtaining unit 25 starts receiving the positional data representing the position of the mobile phone 300 through the communication unit 4 from the user's mobile phone 300 in response to the instruction of CPU 21.

Moreover, the selection unit 30 selects any one of image forming devices (stores) (step S303). In other words, the selection unit 30 identifies the position of the user based on the positional data of the mobile phone 300 obtained by the position obtaining unit 25 and selects an image forming device 100 (store) which is the closest to the position of the user (mobile phone 300) based on the identified position and the location data stored in the storage unit 3.

Here, the judgment unit 27 judges whether or not the position identified based on the positional data of mobile phone 300 obtained by the position obtaining unit 25 is within the boundary region determined by the region determining unit 24, i.e. the region within a radius of 2 km from the image forming device 100 selected by the selection unit 30 (step S304).

If the judgment unit 27 determines that there is no user (mobile phone 300) within the determined boundary region (step S304: NO), in other words, if the user is at a point A shown in FIG. 9, the processing returns back to step S303.

If, on the other hand, the judgment unit 27 determines that a user (mobile phone 300) is within the determined boundary region (step S304: YES), in other words, if the user is at a point B shown in FIG. 9 for example, the data transmission unit 26 starts transmitting the document data registered by the user to the image forming device 100 in the closest store selected at step S303 (step S305). Here, the data transmission unit 26 transmits an ID corresponding to the document data together with the URL of personal computer 200 and the print setting.

According to the configuration described above, transmission of the document data to be printed is completed before the user arrives at the image forming device 100 in the present invention. Thus, the user does not have to wait while the document data is downloaded to the image forming device 100 and can start printing as soon as he/she arrives at the store.

Meanwhile, the CPU 102 of the image forming device 100 in the closest store receives the ID as well as the URL of personal computer 200 and the print setting together with the document data from the print server 1 through the communication unit 112 (step S401).

The received document data, ID, URL of personal computer 200 and the print setting are stored in the storage unit 111 in association with one another (step S402).

Figure 11:
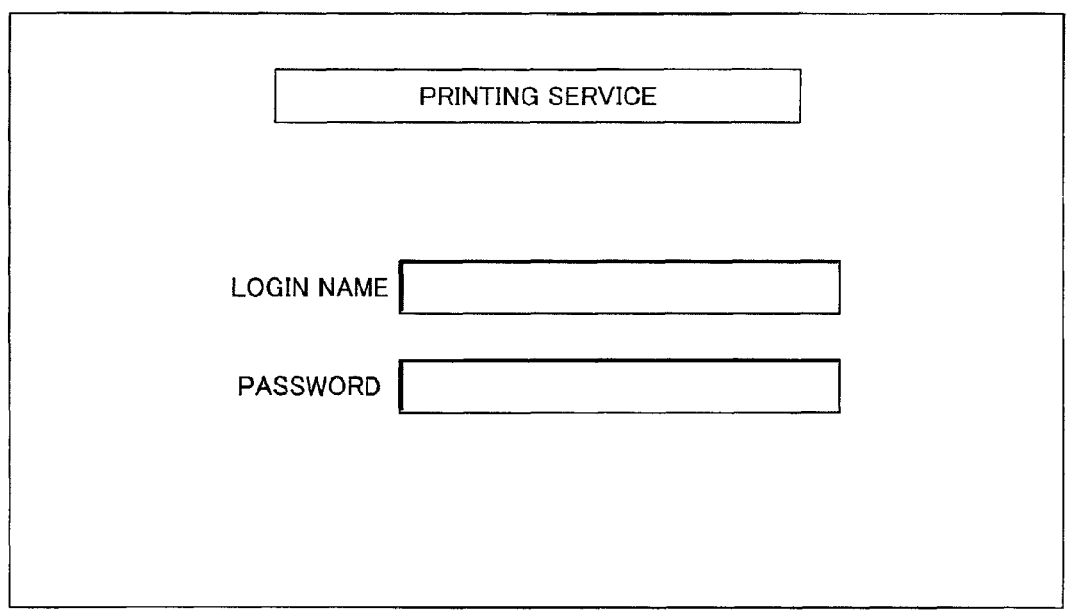
FIG. 11 is an explanatory view illustrating a screen for login displayed on a display unit of the image forming device.

Thereafter, the user who arrives at the store (point C in FIG. 9) performs printing based on the document data stored in the storage unit 111 of the image forming device 100. First, the user logs in the image forming device 100 in the store to receive authentication. FIG. 11 is an explanatory view illustrating a screen for login displayed on the display unit 110 of the image forming device 100.

On the screen for login shown in FIG. 11, a login name box and a password box are provided. The user appropriately operates the operation panel 109 to enter, for example, the URL of the personal computer 200 in the login name box and the ID issued by the print server 1 in the password box.

The CPU 102 accepts the login name and password through the screen for login and compares them with the ID and the URL of the personal computer 200 stored in the storage unit 111 to perform authentication for the user (step S403).

If, on the other hand, the user operates the soft key indicating "not using GPS function" on the registration screen shown in FIG. 8, the image forming device 100 in the store has not received the document data to be printed, the ID and the URL of the personal computer 200 from the print server 1. Thus, no authentication for the user can be performed. In such a case, the CPU 102 is configured to transmit the accepted login name and password to the print server 1 and perform authentication at the print server 1.

When the authentication is completed, the CPU 102 confirms the data stored in the storage unit 111 to judge whether or not there is document data corresponding to the accepted login name or password (step S404).

If the CPU 102 determines that there is document data corresponding to the accepted login name or password (step S404: YES), an acceptance screen for accepting setting for printer based on the document data to be printed is shown on the display unit 110 to accept the setting from the user (step S405).

Figure 12:
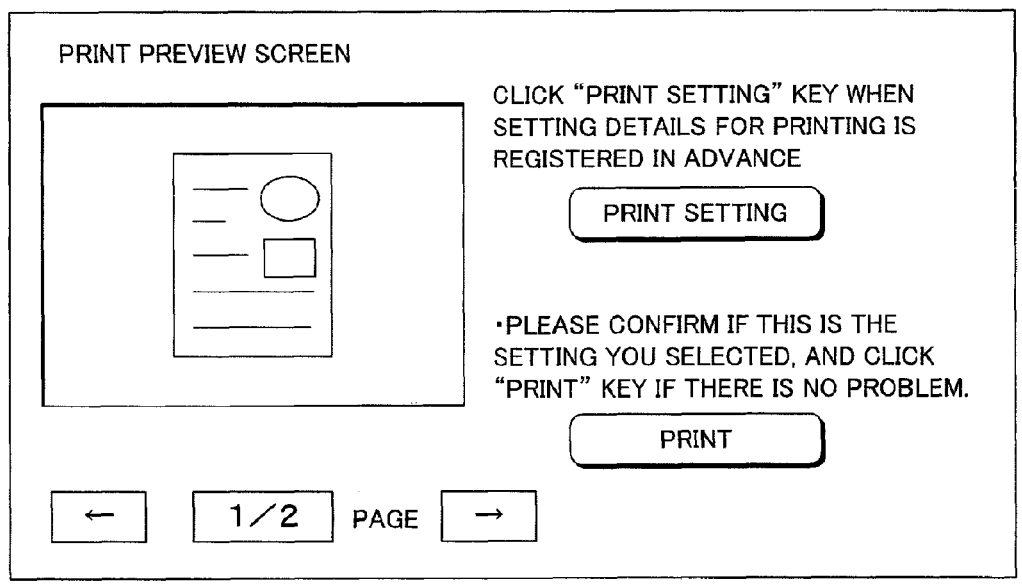
FIG. 12 is an explanatory view illustrating an acceptance screen for accepting setting for the printer from a user.

FIG. 12 is an explanatory view illustrating the acceptance screen for accepting setting for the printer from a user. A preview image based on document data is shown on the acceptance screen in FIG. 12 for the user to confirm the setting based on the preview image. Moreover, the user operates the soft key of "print setting" on the acceptance screen in FIG. 12 to perform print setting. In the operation concerning this setting, each setting value for operation is displayed as a default based on the print setting stored in the storage unit 111.

When the setting is completed, the user operates the soft key of "print" on the acceptance screen shown in FIG. 12 for the CPU 102 to accept the instruction for printing an image based on the document data stored in the storage unit 111. The CPU 102 that accepted the instruction for printing then instructs the image output unit 108 to print the image. The image output unit 108 prints an image based on the document data stored in the storage unit 111 on a recording paper in accordance with the instruction from the CPU 102 (step S406).

When printing is completed, the end notification unit 105 transmits the fact of completion to the print server 1 (step S407). This notification will hereinafter be referred to as a notice of completion.

When printing is completed, the deleting unit 104 deletes document data to be printed and data corresponding to the data (ID, URL of personal computer 200 and print setting) from the storage unit 111 (step S408), and terminates the processing.

After the data transmission unit 26 of the print server 1 has started transmission of document data and the like at step S305, the CPU 21 judges whether or not transmission of this document data and the like is completed (step S306).

If it is determined that the transmission of document data has not been completed (step S306: NO), the CPU 21 repeats the judgment processing until the transmission is completed.

If, on the other hand, it is determined that the transmission of document data and the like has been completed (step S306: YES), the CPU 21 judges whether or not a notice of completion is received from the image forming device 100 (step S307).

If the CPU 21 determines that the notice of completion has not been received from the image forming device 100 (step S307: NO), the CPU 21 waits for reception of the notice of completion.

If, on the other hand, the CPU 21 judges that the notice of completion has been received from the image forming device 100 (step S307: YES), the data deleting unit 29 deletes the document data transmitted to the image forming device 100 and the data corresponding thereto (ID, URL of personal computer 200 and print setting) from the storage unit 3 (step S308), and then the processing is terminated.

If the user operates the soft key indicating "not using GPS function" on the registration screen shown in FIG. 8, the image forming device 100 in the store has not received the document data from the print server 1. At step S404, the CPU 102 determines that there is no document data corresponding to the accepted login name or password (step S404: NO).

In such a case, the CPU 102 requests for transmission of document data or the like corresponding to the accepted login name or password to the print server 1, and downloads the data into the storage unit 111 (step S409).

When downloading of the document data or the like is completed, an acceptance screen for accepting setting in the printer based on the downloaded document data is shown on the display unit 110, to accept setting from the user (step S410) (see FIG. 12).

When setting is completed, the user operates the soft key of "print" on the acceptance screen as shown in FIG. 12 for the CPU 102 to accept an instruction for printing an image based on the downloaded document data. The CPU 102 that accepted printing instruction then instructs the image output unit 108 to perform printing. The image output unit 108 prints the image based on the downloaded document data on a recording paper in accordance with the instruction from the CPU 102 (step S411).

When printing is completed, the end notification unit 105 transmits a notice of completion to the print server 1 (step S412). Moreover, the deleting unit 104 deletes, when printing is completed, the printed document data and data corresponding thereto from the storage unit 111 (step S413) and terminates the processing.

As described above, it is possible in the present invention to respond to the needs of a user who is concerned about invasion of privacy due to the use of GPS function.

Furthermore, the present invention is not limited to the description above.

Another configuration example may also be employed such that, when the instruction for printing an image based on document data has not been accepted from a user for a predetermined period of time or longer, the deleting unit 104 of the image forming device 100 deletes the document data and data corresponding thereto (ID, URL of personal computer 200 and print setting) from the storage unit 111.

Furthermore, the data deleting unit 29 of the print server 1 may also be configured to delete the document data transmitted to the image forming device 100 and data corresponding thereto (ID, URL of personal computer 200 and print setting) from the storage unit 3 when a notice of completion has not been received from the image forming device 100 for a predetermined time period or longer.

Note that, though the above description explained an example in the case where the print server 1 transmits an ID to the personal computer 200 for the user to obtain the ID and the user appropriately operates the operation panel 109 of the image forming device 100 to input the ID after traveling to a store, it is not limited thereto.

Another configuration may also be employed such that, for example, the processing at step S203 is exchanged with the processing at step S204 performed in the print server 1, i.e., the e-mail address of mobile phone 300 is obtained prior to transmission of ID, so that the ID is also transmitted to the mobile phone 300 while it is transmitted to the personal computer 200.

In such a case, the user can input an ID using RFID communication, saving his/her trouble of operating the operation panel 109 of the image forming device 100.

(Embodiment 2 )

The processing performed by the image forming system in Embodiment 2 will be described with an example. For convenience of explanation, an example will be described in which a user transmits document data created using the personal computer 200 at home to the print server 1 and performs image forming based on the document data at an image forming device installed in a store other than the closest store.

The process of transmitting document data concerning a document created by the user using the personal computer 200, for registration and storage, to the print server 1 has already been described with reference to FIG. 5. Thus, the description thereof will not be repeated here.

An example will be described below in which the user who finished registering the document data to the print server 1 goes to, instead of the store closest to his/her home, another store and performs image forming based on the document data at an image forming device installed in that store.

Figure 13:
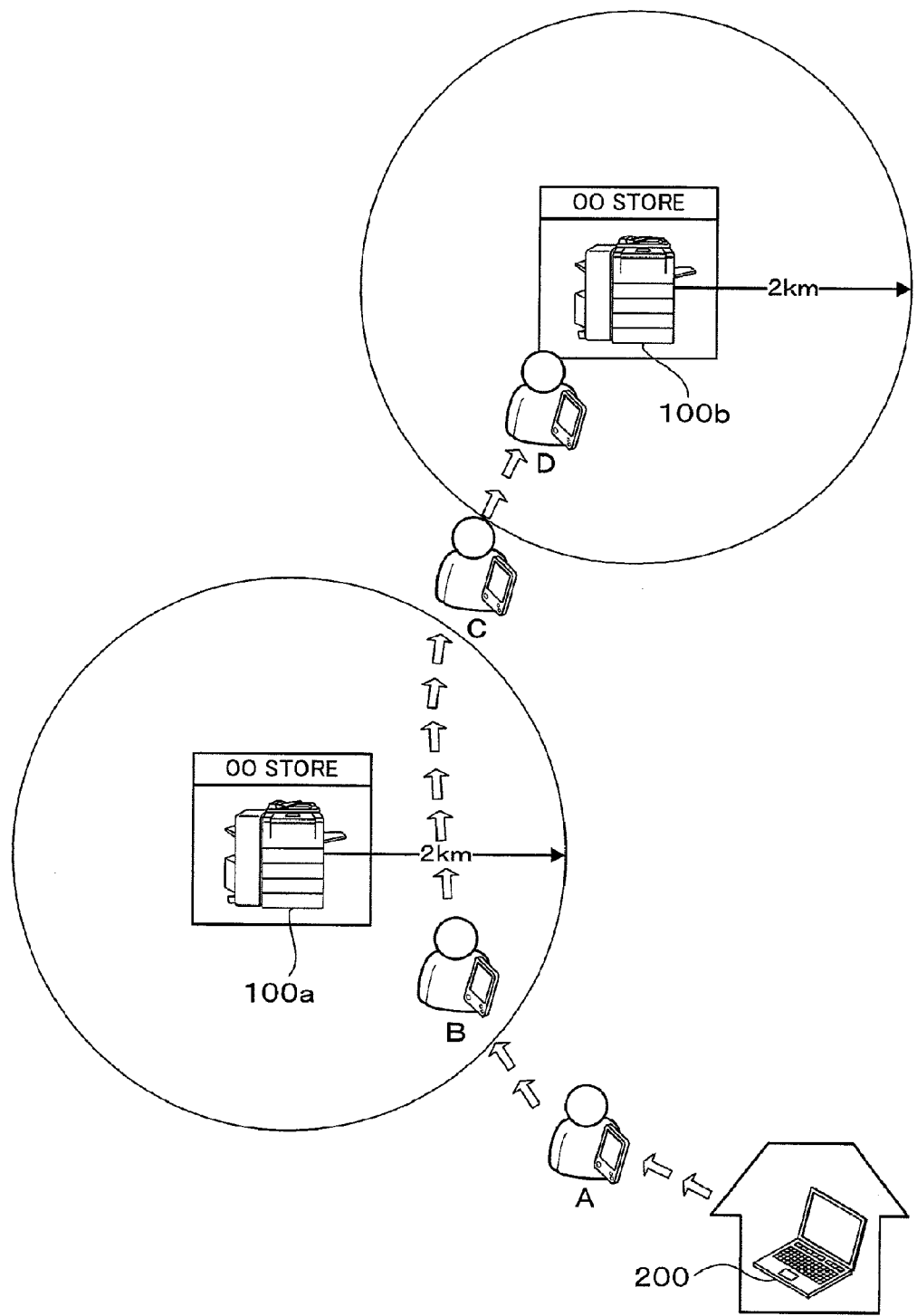
FIG. 13 is an explanatory view illustrating the relationship between traveling of a user and a boundary region in an image forming system according to Embodiment 2.

FIG. 13 is an explanatory view illustrating the relationship between traveling of a user and a boundary region in the image forming system according to Embodiment 2. After the user transmits and registers document data to be printed to the print server 1, he/she passes by the closest store, carrying the mobile phone 300, and goes to another store. Here, the volume of document data is assumed to be 4 Mb or smaller.

Figure 14:
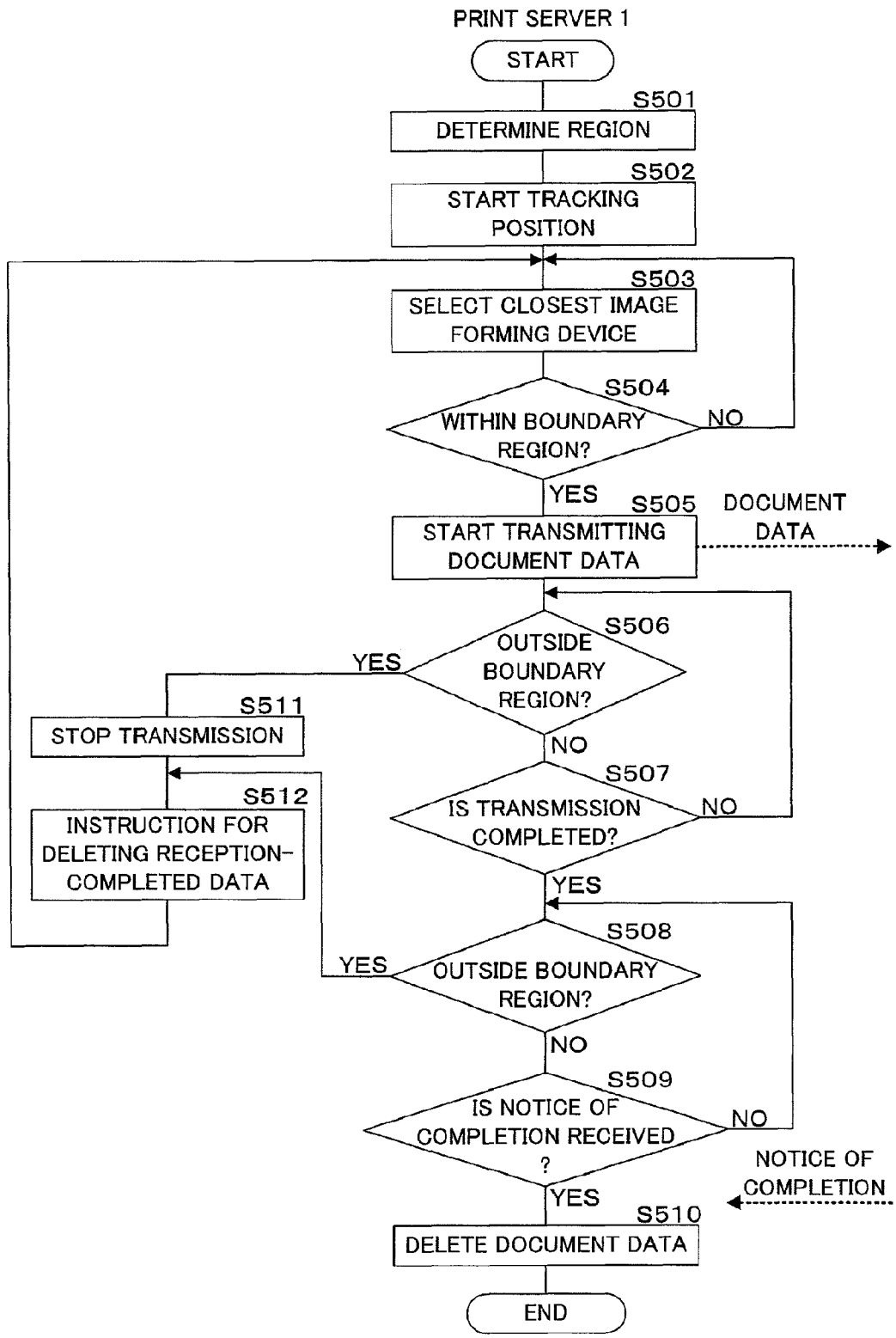
FIG. 14 is a flowchart illustrating an example of processing performed by a print server in the image forming system according to Embodiment 2.

FIG. 14 is a flowchart illustrating an example of processing performed by the print server 1 in the image forming system according to Embodiment 2.

At step S204 in FIG. 5, if a result of selection indicating cooperation with GPS function is transmitted to the print server 1, the region determining unit 24 of print server 1 determines a boundary region by the method described above (step S501). That is, the region determining unit 24 determines a range within a radius of 2 km from the location of a store as the boundary region, since the volume of the document data to be transmitted is not more than 4 Mb.

Subsequently, the CPU 21 starts tracking the position of the user (step S502). That is, the CPU 21 instructs the position obtaining unit 25 to track the position. The position obtaining unit 25 then starts receiving positional data representing the position of mobile phone 300 from the mobile phone 300 of the user through the communication unit 4 in response to the instruction from the CPU 21.

The selection unit 30 selects any one of the image forming devices (stores) (step S503). That is, the selection unit 30 identifies the position of the user based on the positional data of mobile phone 300 obtained by the position obtaining unit 25 and selects an image forming device 100a (store) closest to the user (mobile phone 300)'s position (home).

Then, the judgment unit 27 judges whether or not the position identified based on the positional data of mobile phone 300 obtained by the position obtaining unit 25 is within a radius of 2 km from the image forming device 100a (step S504).

If the judgment unit 27 determines that there is no user (mobile phone 300) within the boundary region (step S504: NO), in other words, if the user is at a point A in FIG. 13, the processing returns back to step S503.

If, on the other hand, the judgment unit 27 determines that there is a user (mobile phone 300) within the boundary region (step S504: YES), in other words, if the user is at a point B in FIG. 13 for example, the data transmission unit 26 starts transmitting document data registered by the user to the image forming device 100a in the closest store selected at step S503 (step S505). Together therewith, the data transmission unit 26 also transmits an ID corresponding to the document data, URL of personal computer 200 and print setting.

After a predetermined period of time has passed since the transmission of document data and the like is started by the data transmission unit 26, the judgment unit 27 judges whether or not the position identified based on the positional data of mobile phone 300 obtained by the position obtaining unit 25 is outside the boundary region for the image forming device 100a (step S506).

If the judgment unit 27 determines that the position of mobile phone 300 (user) is outside the boundary region for the image forming device 100a (step S506: YES), for example, if the user is at a point C in FIG. 13, the CPU 21 instructs the data transmission unit 26 to stop transmitting document data and the like. The data transmission unit 26 stops transmission of document data and the like in response to the instruction from the CPU 21 (step S511).

Subsequently, the instruction transmitting unit 28 transmits to the image forming device 100a an aborting instruction for deleting the reception-completed data that has already been received during a period from the start of transmission to the time point when the instruction is transmitted through the communication unit 4 (step S512).

Thereafter, the processing returns to step S503 again. More specifically, the selection unit 30 identifies the position of user based on the positional data of mobile phone 300 obtained by the position obtaining unit 25, and selects an image forming device 100b (another store) which is the closest to the current position of the user (mobile phone 300).

Here, it may also be configured that the result of selection is stored as a history in order to prevent the image forming device 100a being selected again by the selection unit 30, and that a store having a history of being selected may be excluded from selection.

It is also possible, when there is an overlapping area between the boundary regions for two different stores and a user is present in this area, the document data and the like is once transmitted to both image forming devices and then an aborting instruction is transmitted to any one of them based on the result of a later-determined position of the user.

If the judgment unit 27 determines that the position of mobile phone 300 is not outside the boundary region for the image forming device 100*a* (step S506: NO), the CPU 21 determines whether or not transmission of document data and the like is completed (step S507).

If the CPU 21 determines that transmission of document data and the like has not been completed (step S507: NO), the processing returns back to step S506. After a predetermined time has elapsed, the judgment unit 27 again judges whether or not the position of mobile phone 300 is outside the boundary region for the image forming device 100*a*.

If, on the other hand, the CPU 21 determines that transmission of the document data and the like has been completed (step S507: YES), the judgment unit 27 again judges, after a predetermined time has elapsed, whether or not the position of mobile phone 300 obtained by the position obtaining unit 25 is outside the boundary region for the image forming device 100*a* (step S508).

If the judgment unit 27 determines that the position of mobile phone 300 is outside the boundary region for the image forming device 100*a* (step S508: YES), the processing returns back to step S512, where the instruction transmitting unit 28 transmits an aborting instruction for deleting reception-completed data, i.e. all the document data and the like, to the image forming device 100*a* through the communication unit 4.

If the judgment unit 27 determines that the position of mobile phone 300 is not outside the boundary region for the image forming device 100*a* (step S508: NO), the CPU 21 determines whether or not a notice of completion has been received from the image forming device 100*a* (step S509).

If the CPU 21 determines that the notice of completion has not been received from the image forming device 100*a* (step S509: NO), the processing returns back to step S508.

Moreover, if the CPU 21 determines that the notice of completion has been received from the image forming device 100*a* (step S509: YES), the data deleting unit 29 deletes the document data transmitted to the image forming device 100*a* and data corresponding thereto from the storage unit 3 (step S510), and terminates the processing.

The processing in another case such as when the user is within the boundary region for the image forming device 100*b*, i.e. a point D in FIG. 13 for example, is similar to that in Embodiment 1. Thus, a detailed description thereof will not be repeated here.

Figure 15:
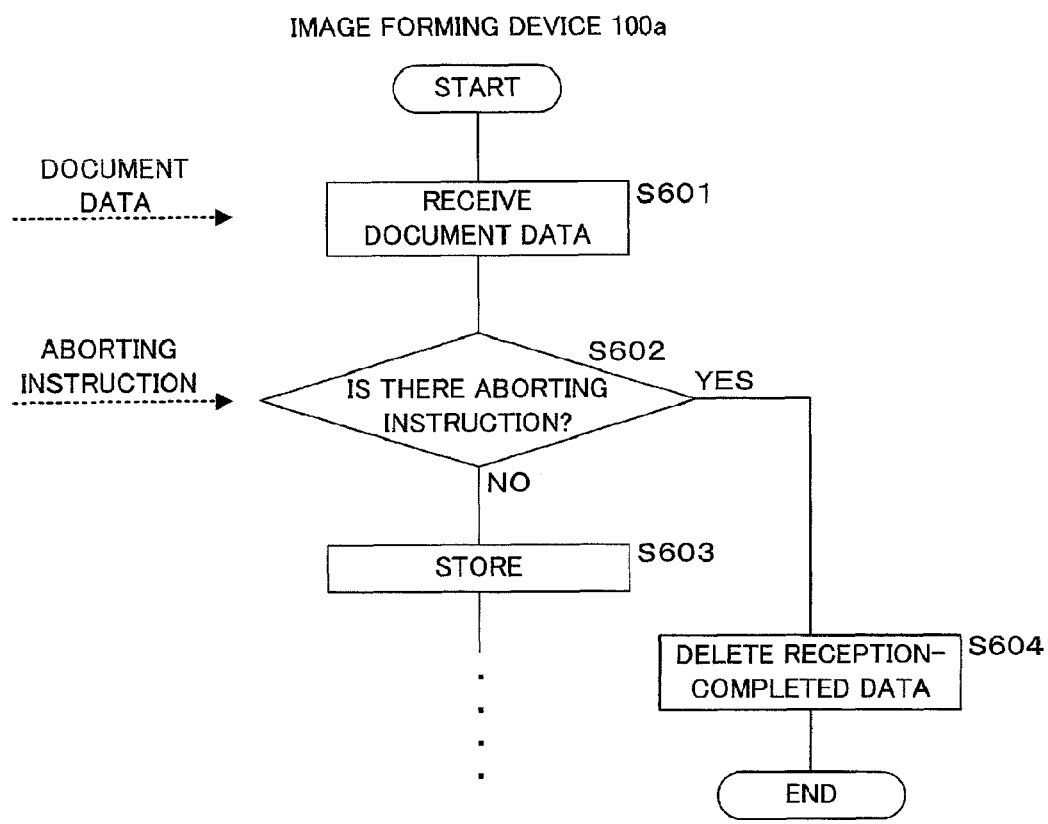
FIG. 15 is a flowchart illustrating processing performed by an image forming device corresponding to the processing performed by the print server shown in FIG. 14.

FIG. 15 is a flowchart illustrating the processing performed by the image forming device 100*a* that corresponds to the processing performed by the print server 1 shown in FIG. 14.

When, for example, a user is at point B in FIG. 13, the data transmission unit 26 starts transmitting document data registered in the print server 1 by the user to the image forming device 100*a* in the closest store together with an ID corresponding to the document data, URL of personal computer 200 and print setting (see step S505).

Here, the CPU 102 of the image forming device 100*a* in the closest store receives the document data as well as the ID, URL of personal computer 200 and print setting from the print server 1 through the communication unit 112 (step S601).

During reception of document data and the like as described above, the CPU 102 judges whether or not an aborting instruction has been received from the print server 1 at predetermined time intervals (step S602).

For example, if the print server 1 transmits the aborting instruction at step S512 and thus the CPU 102 determines that the aborting instruction has been received (step S602: YES), the aborting unit 103 deletes reception-completed data which has already been received by that time from the storage unit 111 (step S604), and terminates the processing.

Furthermore, if the CPU 102 determines that the aborting instruction has not been received from the print server 1 (step S602: NO), the reception-completed data (document data, ID, URL and print setting) which has already been received by that time is stored in association with one another in the storage unit 111 (step S603).

Since the further processing is similar to that in steps S403 to 413 in Embodiment 1, detailed description thereof will not be repeated here.

The parts similar to those in Embodiment 1 are denoted by the same reference codes and will not be described in detail.

The present invention is not limited to the description above. Alternatively, the image forming device 100 may also serve as the print server 1. For example, one image forming device 100 may serve as the print server 1 in each area including more than one image forming devices 100 (stores).

Though an example was described in which the mobile object according to the present invention is a mobile phone, it is not limited thereto. The mobile object may alternatively be a PDA or the like having the GPS function.

It is noted that the present invention is not limited to the description above.

For example, when a user is approaching a predetermined store and is determined by the print server 1 that he/she is within a range narrower than a boundary region for the store, e.g., within a radius of 30 m from the store, the print server 1 may transmit an instruction for the image forming device 100 in the store to develop an image (convert PCL into bitmap, for example) of document data which has already been transmitted to the store, or to start up (from an energy-saving mode to a wait mode or an image-quality-adjusting status).

In this case, the user can print out the document data immediately after he/she arrives at the store, reducing time of work for the user.

(Embodiment 3 )

Figure 16:
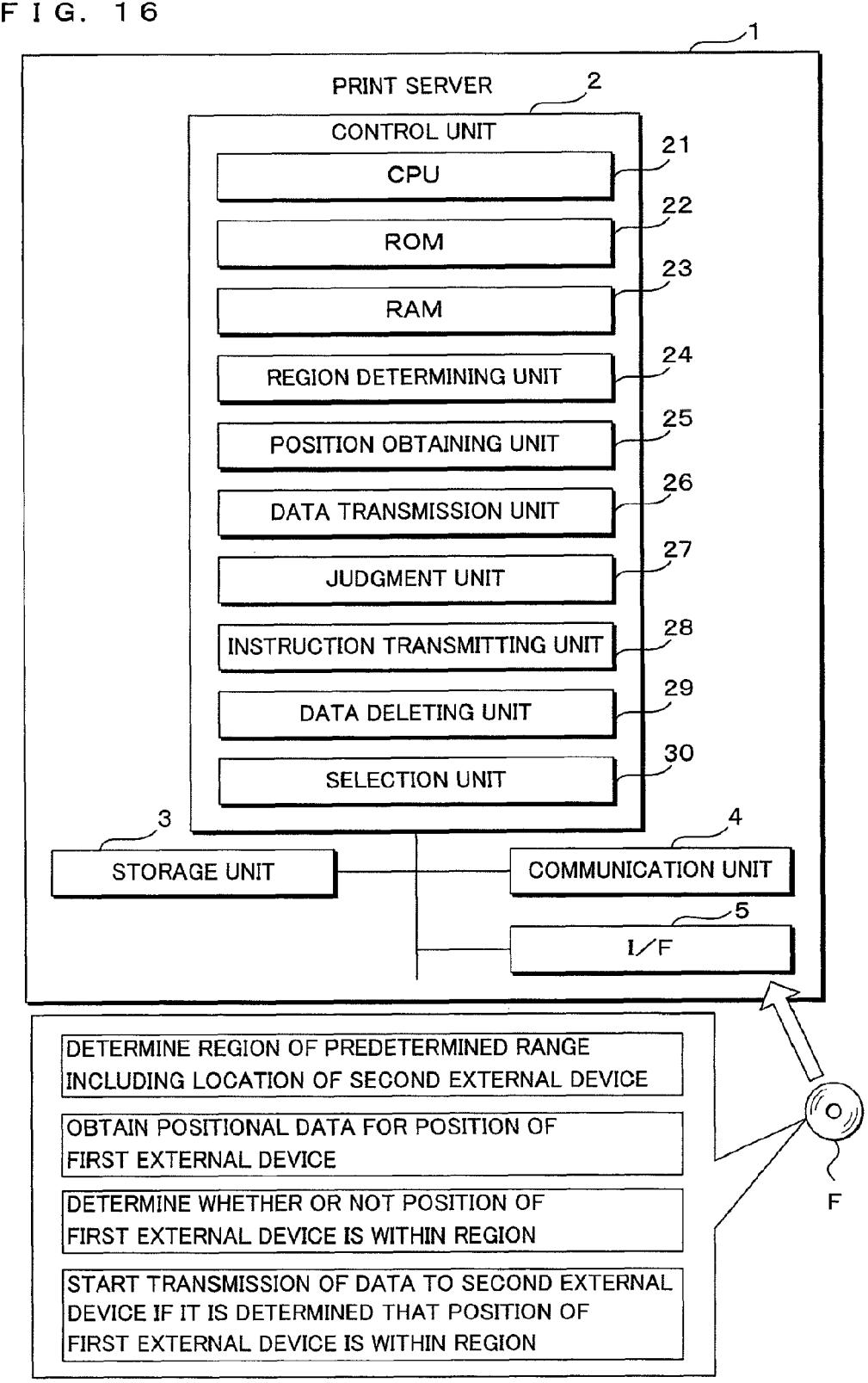
FIG. 16 is a functional block diagram illustrating a configuration of a main part of a print server according to Embodiment 3.

FIG. 16 is a functional block diagram illustrating a configuration of a main part of a print server 1 according to Embodiment 3. The print server 1 in Embodiment 3 is so configured that a computer program for operation can be provided by a portable memory product F such as CD-ROM through an I/F 5. Furthermore, the print server 1 in Embodiment 3 is so configured that a computer program can also be downloaded through the communication unit 4 from an external device (not illustrated). This will be described below in detail.

The print server 1 in Embodiment 3 is provided with an external (or internal) memory product reading device (not illustrated), into which the portable memory product F is inserted. The portable memory product F is stored a program for determining a region of a predetermined range (boundary region) including a location of the second external device (image forming device), obtaining positional data for the position of the first external device (mobile object), judging whether or not the position of the first external device is within the region, and starting transmission of data to the second external device if it is determined that the position of the first external device is within the region. For example, the CPU 21 of the print server 1 installs the program stored the portable memory product F in the ROM 22. Such the program is loaded to the RAM 23 and executed therein. Thus, the print server 1 in Embodiment 3 functions as the print server 1 according to Embodiments 1 and 2 in the present invention.

As a memory product, a so-called program medium may be employed, or a tape system such as a magnetic tape and a cassette tape, a disk system including a magnetic disk such as a flexible disk and a hard disk as well as an optical disk such as CD-ROM, MO, MD and DVD, a card system such as an IC card (including a memory card) and an optical card, or a medium fixedly holding a program code including a semiconductor memory such as a mask ROM, EPROM, EEPROM and flash ROM may also be employed.

It is also possible to use a medium holding a program code in a flowing manner, i.e. a program code downloaded from a network through the communication unit 4. Note that, if the program is thus downloaded from the communication network, the program for downloading may be stored in a main-body device in advance or may be installed from another memory product. Note that the present invention can be realized in the form of a computer data signal embedded in carrier wave, the signal being generated from the program code which is embodied by electronic transmission.

The parts similar to those in Embodiment 1 are denoted by the same reference codes and are not described in detail.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image forming system comprising: a mobile object; an information processing device; and an image forming device which receives data from the information processing device to perform image forming, wherein
    the information processing device;
    a storage unit that stores a location data representing a location of the image forming device;
    a region determining unit that determines a region of a predetermined range including the location of the image forming device based on the location data stored in the storage unit;
    a position obtaining unit that obtains a positional data for a position of the mobile object;
    a judgment unit that judges whether or not the position of the mobile object is within the region determined by the region determining unit based on the positional data obtained by the position obtaining unit;
    a transmission unit that starts transmission of data to the image forming device if the judgment unit determines that the position of the mobile object is within the region; and
    an instruction transmitting unit that transmits, to the image forming device, a deleting instruction for deleting reception-completed data, if the judgment unit determines that the position of the mobile object is outside the region after the transmission unit started transmission of data to the image forming device, and
    the image forming device includes
    a unit that deletes, when receiving the deleting instruction, the reception-completed data up to a time point when receiving the deleting instruction.

2. The image forming system according to claim 1, wherein the region determining unit determines the region based on a volume of data to be transmitted to the image forming device.

3. The image forming system according to claim 1, wherein the image forming device includes
    an end notification unit that gives, when the image forming based on the data received from the information processing device is completed, a notice of completion to the information processing device, and
    the information processing device includes
    a unit that deletes the data for the image forming when receiving the notice.

4. The image forming system according to claim 1, wherein a plurality of the image forming devices are provided,
    the information processing device includes a selection unit that selects any one of the image forming devices based on the positional data obtained by the position obtaining unit and the location data stored in the storage unit, and
    the region determining unit determines the region for the any one of the image forming devices selected by the selection unit.

5. An information processing device comprising:
    a storage unit that stores a location data representing a location of a second external device;
    a region determining unit that determines a region of a predetermined range including the location of the second external device based on the location data stored in the storage unit;
    a position obtaining unit that obtains a positional data for a position of a first external device;
    a judgment unit that judges whether or not the position of the mobile object is within the region determined by the region determining unit based on the positional data obtained by the position obtaining unit;
    a transmission unit that transmits data to the second external device based on the positional data obtained by the position obtaining unit and the region determined by the region determining unit;
    a transmission unit that starts transmission of data to the second external device if the judgment unit determines that the position of the first external device is within the region; and
    an instruction transmitting unit that transmits, to the second external device, a deleting instruction for deleting reception-completed data, if the judgment unit determines that the position of the first external device is outside the region after the transmission unit started transmission of data to the second external device.

6. The information processing device according to claim 5, wherein
    the region determining unit determines the region based on a volume of data to be transmitted to the second external device.

7. The information processing device according to claim 5, comprising a unit that deletes data transmitted to the second external device when receiving a predetermined notice from the second external device.

8. An image forming device that receives data from the information processing device according to claim 5, comprising:
    a reception unit that receives the deleting instruction for deleting the reception-completed data from the information processing device, while receiving the data from the information processing device; and
    a unit that deletes the reception-completed data up to a time point when receiving the deleting instruction, when the reception unit receives the deleting instruction.

9. The image forming device according to claim 8, comprising the deleting unit that deletes the data for image forming when the image forming based on the data received from the information processing device is completed.

10. A data transmission method of transmitting data using an information processing device including a storage unit in which a location data representing a location of a second external device is stored, comprising:

a region determining step of determining a region of a predetermined range including the location of the second external device based on the location data stored in the storage unit;

a position obtaining step of obtaining a positional data for a position of a first external device;

a judging step of judging whether or not the position of the first external device is within the region determined by the region determining step based on the positional data obtained at the position obtaining step;

a transmitting step of starting transmission of data to the second external device if the position of the first external device is determined to be within the region at the judging step; and an instruction transmitting step of transmitting, to the second external device, a deleting instruction for deleting reception-completed data, if the position of the first external device is determined to be outside the region at the judging step after the transmission of the data to the second external device is started at the transmitting step.

11. A non-transitory computer-readable memory product storing a computer program for causing a computer including a storage unit to transmit data, wherein a location data representing a location of a second external device is stored in the storage unit, the computer program comprises:

a region determining step of causing the computer to determine a region of a predetermined range including the location of the second external device based on the location data stored in the storage unit;

a position obtaining step of causing the computer to obtain a positional data for a position of a first external device;

a judging step of causing the computer to judge whether or not the position of the first external device is within the region determined by the region determining step based on the positional data obtained at the position obtaining step;

a transmitting step of causing the computer to start transmission of data to the second external device if the position of the first external device is determined to be within the region at the judging step;

an instruction transmitting step of transmitting, to the second external device, a deleting instruction for deleting reception-completed data, if the position of the first external device is determined to be outside the region at the judging step after the transmission of the data to the second external device is started at the transmitting step.

* * * * *